US012732877B2

(12) United States Patent
Xiong et al.

(10) Patent No.: US 12,732,877 B2
(45) Date of Patent: Sep. 8, 2026

(54) CELL HANDOVER METHOD AND APPARATUS, AND COMMUNICATION DEVICE AND STORAGE MEDIUM

(71) Applicant: BEIJING XIAOMI MOBILE SOFTWARE CO., LTD., Beijing (CN)

(72) Inventors: Yi Xiong, Beijing (CN); Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 483 days.

(21) Appl. No.: 18/261,350

(22) PCT Filed: Jan. 14, 2021

(86) PCT No.: PCT/CN2021/071837

§ 371 (c)(1),
(2) Date: Jul. 13, 2023

(87) PCT Pub. No.: WO2022/151193

PCT Pub. Date: Jul. 21, 2022

(65) Prior Publication Data

US 2024/0073756 A1 Feb. 29, 2024

(51) Int. Cl.
*H04W 36/00* (2009.01)
*H04W 36/32* (2009.01)

(52) U.S. Cl.
CPC ... *H04W 36/00837* (2018.08); *H04W 36/324* (2023.05)

(58) Field of Classification Search
CPC ...................... H04W 36/00837; H04W 36/324
See application file for complete search history.

(56) References Cited

U.S. PATENT DOCUMENTS 8,195,166 B1 6/2012 Oprescu-Surcobe et al.
8,693,439 B2 * 4/2014 Vesely .......... H04W 36/008375 370/332
2011/0075632 A1 * 3/2011 Lim ................ H04W 36/00224 370/331

(Continued)

FOREIGN PATENT DOCUMENTS

CN 111010708 A 4/2020
EP 2 773 149 A1 9/2014

(Continued)

OTHER PUBLICATIONS

International Search Report & Written Opinion Issued Mar. 29, 2021, in PCT/CN2021/071837, filed on Jan. 14, 2021, with English translation, 13 pages.

(Continued)

*Primary Examiner* — Rafael Pérez-Gutiérrez
*Assistant Examiner* — Gilbert M. Grant
(74) *Attorney, Agent, or Firm* — Oblon, McClelland, Maier & Neustadt, L.L.P.

(57) ABSTRACT

A cell handover method is provided. The method is performed by a terminal and includes determining whether to ignore a handover command of cell handover according to a predicted value of a predicted parameter, in which the predicted parameter comprises a mobility and service characteristic parameter and/or a communication performance characteristic parameter of the terminal after the terminal is handed over to a target cell.

20 Claims, 11 Drawing Sheets terminal base station step 21, determining whether to ignore a handover command of cell handover according to a predicted value of a predicted parameter, in which the predicted parameter includes a mobility and service characteristic parameter and/or a communication performance characteristic parameter of the terminal after the terminal is handed over to a target cell wireless communication

(56) References Cited

U.S. PATENT DOCUMENTS

2014/0273949 A1 9/2014 Duggan et al.
2016/0205607 A1 7/2016 Singh et al.
2017/0325138 A1 11/2017 Da Silva et al.
2017/0359782 A1 12/2017 Swaminathan et al.
2023/0300654 A1* 9/2023 Da Silva ........... H04W 36/0085 370/242

FOREIGN PATENT DOCUMENTS

WO WO 2016/111788 A1 7/2016
WO WO 2018/197097 A1 11/2018

OTHER PUBLICATIONS

Chinese Office Action issued Jul. 4, 2022, in CN 202180000225.5, with English translation, 12 pages.
Extended European Search Report issued Jan. 3, 2024 in European Patent Application No. 21918401.7, 11 pages.

* cited by examiner

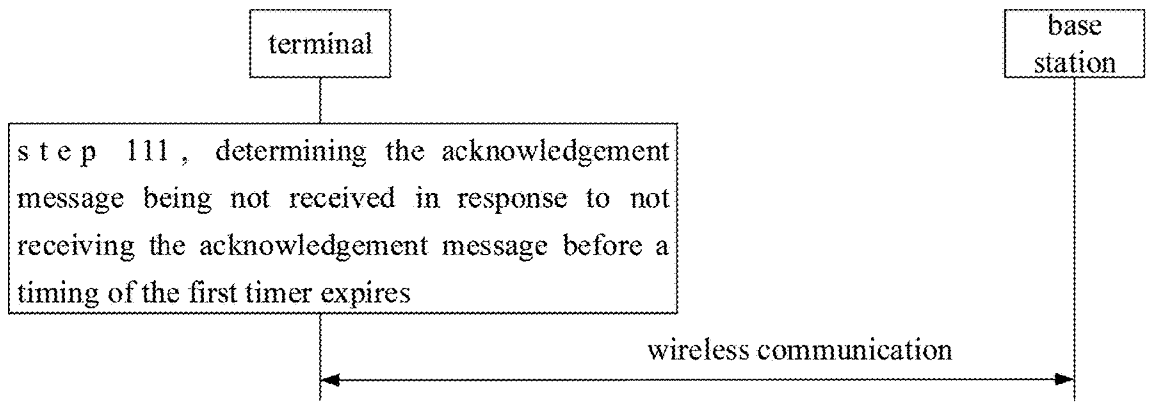

FIG. 11 terminal base station step 121, receiving configuration information sent by a base station, in which the configuration information includes at least one of indication information indicating whether the terminal is allowed to ignore the handover command, threshold range information indicating a threshold range of the predicted value, and the predicted parameter

FIG. 12 terminal base station step 131, receiving a determination message sent by a terminal to determine to ignore a handover command, in which the determination message is a message sent in response to the terminal determining to ignore the handover command of cell handover according to a predicted value of a predicted parameter, and the predicted parameter includes a mobility and service characteristic parameter and/or a communication performance characteristic parameter of the terminal after the terminal is handed over to a target cell

FIG. 13 terminal base station step 141, sending indication information to the terminal, in which the indication information is configured to indicate whether the terminal is allowed to ignore the handover command

FIG. 14

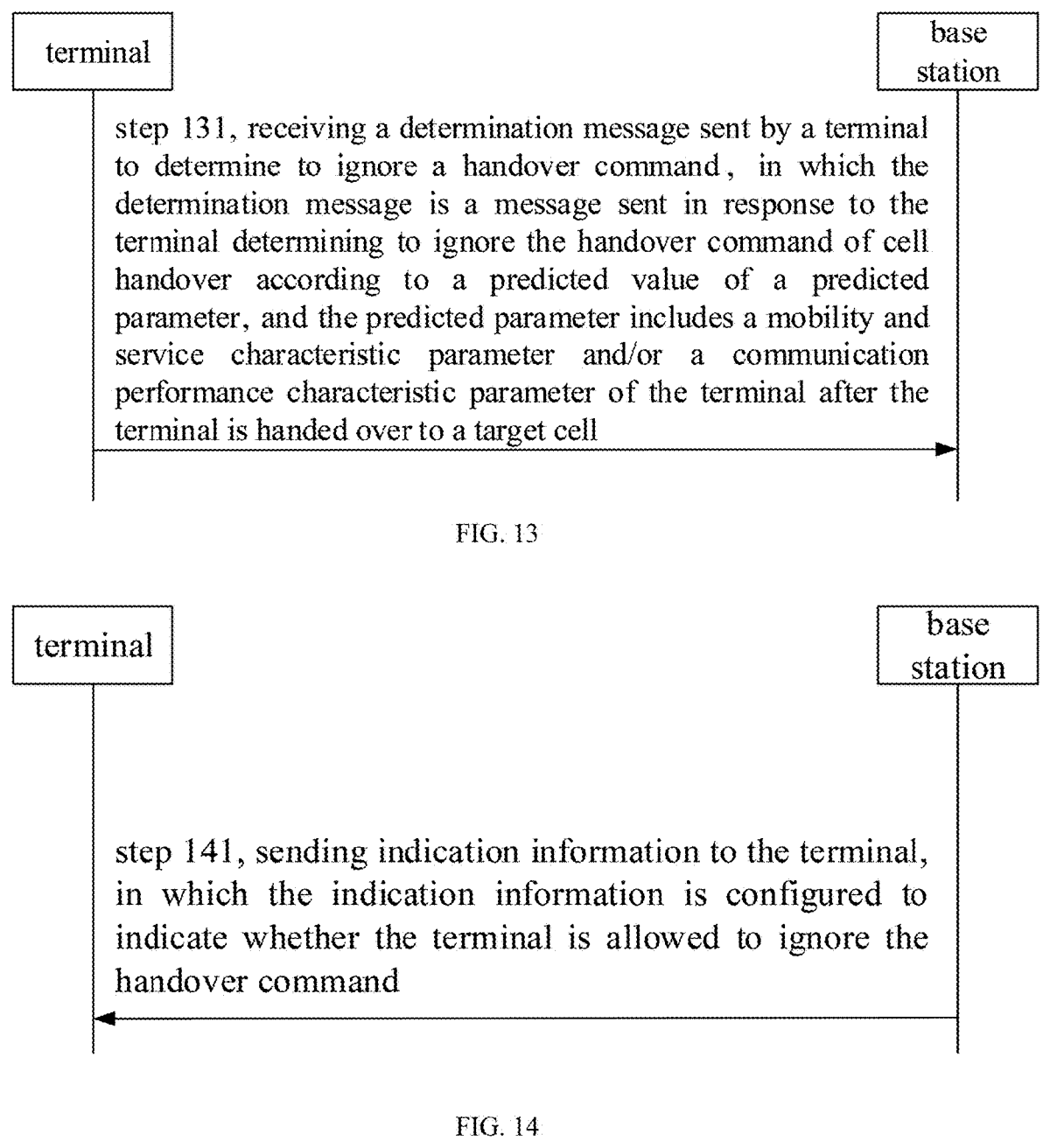

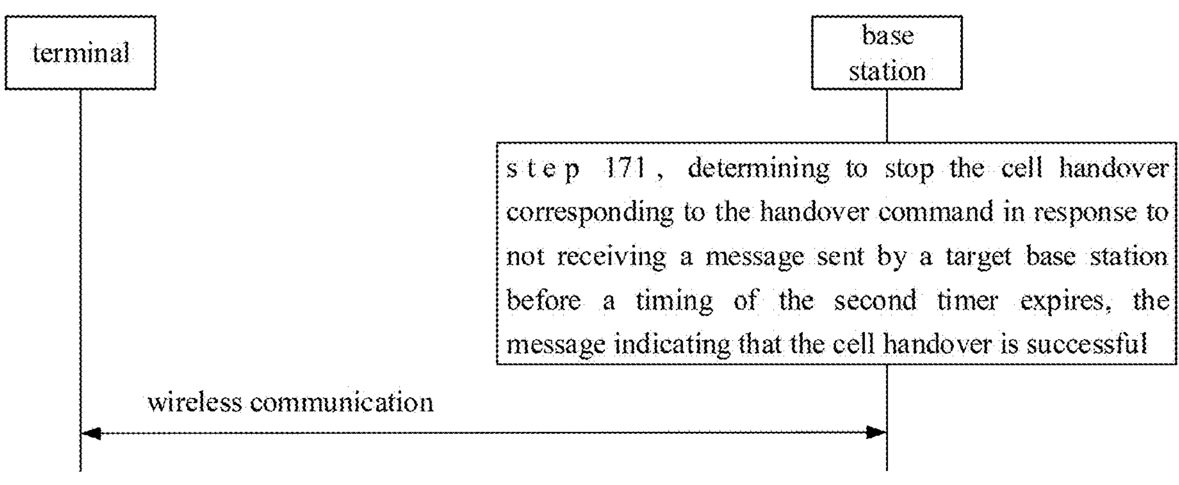
FIG. 17
terminal
base station
step 181, sending configuration information to the terminal, in which the configuration information includes at least one of indication information indicating whether the terminal is allowed to ignore the handover command, threshold range information indicating a threshold range of the predicted value, and the predicted parameter
FIG. 18
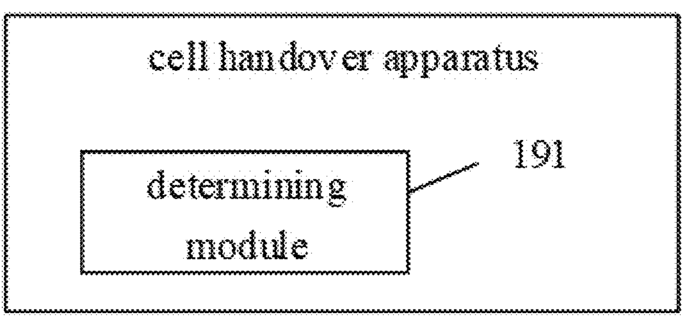
FIG. 19

CELL HANDOVER METHOD AND APPARATUS, AND COMMUNICATION DEVICE AND STORAGE MEDIUM

CROSS-REFERENCE TO RELATED APPLICATION

This application is a U.S. national phase application of International Patent Application No. PCT/CN2021/071837, filed on Jan. 14, 2021, the entire contents of which are incorporated herein by reference.

BACKGROUND

Technical Field

The present disclosure relates to the field of wireless communication technologies, but is not limited to the field of wireless communication technologies, and especially relates to a cell handover method, a cell handover apparatus, a communication device, and a storage medium.

Description of the Related Art

An ultra dense network (UDN) has become a key technology to meet the needs of high traffic communication. In the UDN, a radius of cells is small and the cells are denser. In addition, different types of base stations constitute a heterogeneous network, which makes the network environment more complicated.

In the related art, characteristics of the UDN with small cell radius and denser cells easily lead to ping-pong handover or wireless link connection failure, making a wireless network communication unreliable, which brings challenges to a mobility management mechanism in the UDN.

SUMMARY

According to a first aspect of embodiments of the present disclosure, there is provided a cell handover method, which is performed by a terminal. The method includes determining whether to ignore a handover command of cell handover according to a predicted value of a predicted parameter, in which the predicted parameter includes a mobility and service characteristic parameter and/or a communication performance characteristic parameter of the terminal after the terminal is handed over to a target cell.

According to a second aspect of embodiments of the present disclosure, there is provided a cell handover method, which is performed by a base station. The method includes receiving a determination message sent by a terminal to determine to ignore a handover command, in which the determination message is a message sent in response to the terminal determining to ignore the handover command of cell handover according to a predicted value of a predicted parameter, and the predicted parameter includes a mobility and service characteristic parameter and/or a communication performance characteristic parameter of the terminal after the terminal is handed over to a target cell.

According to a third aspect of embodiments of the present disclosure, there is provided a communication device. The communication device includes a processor, and a memory for storing instructions executable by the processor, in which the processor is configured to implement the method of any embodiment of the present disclosure when executing the executable instructions.

BRIEF DESCRIPTION OF THE DRAWINGS

Various exemplary embodiments of this disclosure that are proposed as examples will be described in detail with reference to the following figures, wherein like numerals reference like elements, and wherein:

FIG. 11 is a flow chart showing a cell handover method according to an illustrative embodiment.

FIG. 12 is a flow chart showing a cell handover method according to an illustrative embodiment.

FIG. 13 is a flow chart showing a cell handover method according to an illustrative embodiment.

FIG. 14 is a flow chart showing a cell handover method according to an illustrative embodiment.

FIG. 17 is a flow chart showing a cell handover method according to an illustrative embodiment.

FIG. 18 is a flow chart showing a cell handover method according to an illustrative embodiment.

FIG. 19 is a schematic diagram illustrating a cell handover apparatus according to an illustrative embodiment.

DETAILED DESCRIPTION OF THE PREFERRED EMBODIMENTS

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

Terms used herein in embodiments of the present disclosure are only for the purpose of describing specific embodiments, but should not be construed to limit the present disclosure. As used in the embodiments of the present disclosure and the appended claims, "a/an", and "the" in singular forms are intended to include plural forms, unless clearly indicated in the context otherwise. It should also be understood that, the term "and/or" used herein represents and contains any or all possible combinations of one or more associated listed items.

It is to be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

For the purpose of brevity and ease of understanding, the terms "greater than" or "less than" are used herein when characterizing the relationship of magnitude. However, for those skilled in the art, it can be understood that the term "greater than" also covers the meaning of "greater than or equal to", and the term "less than" also covers the meaning of "less than or equal to".

Figure 1:
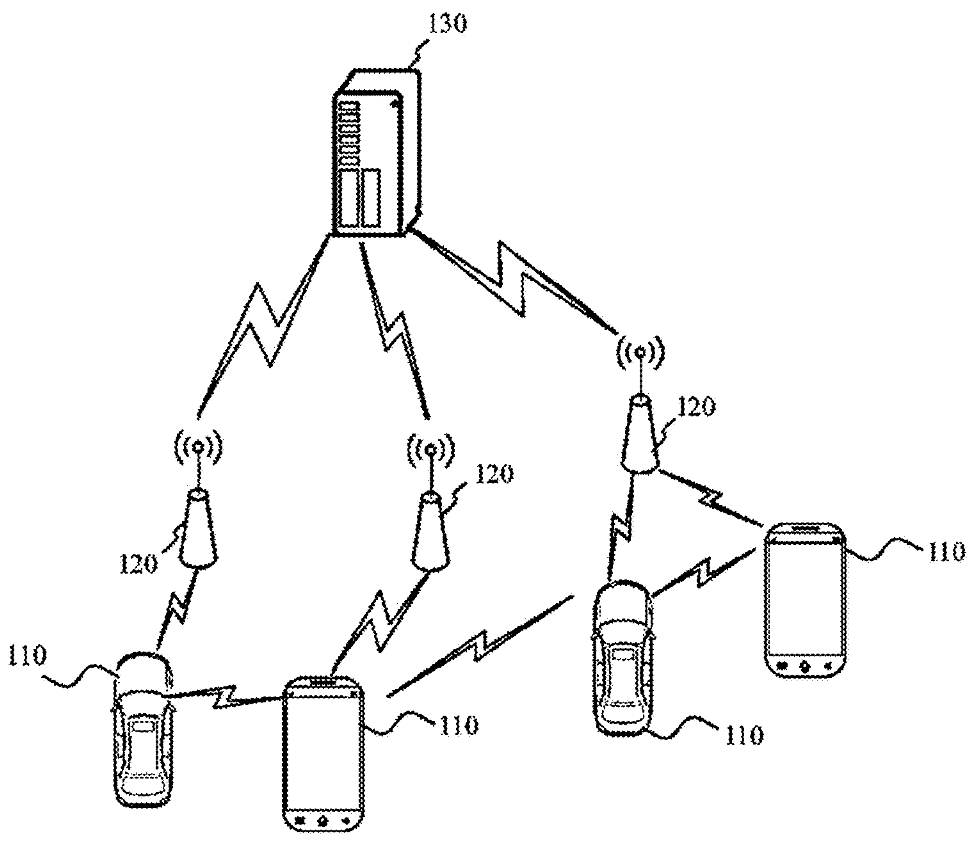
FIG. 1 is a schematic diagram illustrating a wireless communication system.

Referring to FIG. 1, which is a schematic diagram illustrating a wireless communication system provided by an embodiment of the present disclosure. As shown in FIG. 1, the wireless communication system is a communication system based on a mobile communication technology, and may include several user equipments 110 and several base stations 120.

The user equipment 110 may be a device that provides voice and/or data connectivity to a user. The user equipment 110 can communicate with one or more core networks via a radio access network (RAN). The user equipment 110 can be an Internet of Things user equipment, such as a sensor device, a mobile phone (or referred to as a "cellular" phone) and a computer with an Internet of Things user equipment. For example, it can be a fixed, portable, pocket-sized, handheld, built-in computer or vehicle-mounted apparatus. For example, a station (STA), a subscriber unit, a subscriber station, a mobile station, a mobile, a remote station, an access point, a remote terminal, an access terminal, a user terminal, a user agent, a user device, or a user equipment (UE). Alternatively, the user equipment 110 may be a device of an unmanned aerial vehicle. Alternatively, the user equipment 110 may be a vehicle-mounted device, for example, a driving computer with a wireless communication function, or a wireless user equipment externally connected with a driving computer. Alternatively, the user equipment 110 may be a roadside device, such as a street lamp, a signal lamp or other roadside devices with a wireless communication function.

The base station 120 may be a network side device in the wireless communication system. The wireless communication system may be a $4^{th}$ generation mobile communication (4G) system, also referred to as a long term evolution (LTE) system. Alternatively, the wireless communication system may be a 5G system, also referred to as a new radio (NR) system or a 5G NR system. Alternatively, the wireless communication system may be a next generation system of the 5G system. The access network in the 5G system may be referred to as a new generation-radio access network (NG-RAN).

The base station 120 may be an evolved base station (eNB) used in the 4G system. Alternatively, the base station 120 may be a centralized distributed architecture base station (gNB) used in the 5G system. When the base station 120 adopts the centralized distributed architecture, it usually includes a central unit (CU) and at least two distributed units (DUs). A protocol stack of a packet data convergence protocol (PDCP) layer, a radio link control (RLC) layer and a media access control (MAC) layer is provided in the central unit. A protocol stack of a physical (PHY) layer is provided in the distributed unit. The specific implementation of the base station 120 is not limited in the embodiments of the present disclosure.

A wireless connection may be established between the base station 120 and the user equipment 110 through a wireless radio. In different embodiments, the wireless radio is a wireless radio based on the 4th generation mobile communication network technology (4G) standard. Alternatively, the wireless radio is a wireless radio based on the 5th generation mobile communication network technology (5G) standard. For example, the wireless radio is a new radio. Alternatively, the wireless radio may also be a wireless radio based on the next generation mobile communication network technology standard of the 5G.

In some embodiments, an end to end (E2E) connection may also be established between the user equipments 110, for example, a vehicle to vehicle (V2V) communication, a vehicle to infrastructure (V2I) communication and a vehicle to pedestrian (V2P) communication in a vehicle to everything (V2X) communication.

Here, the above-mentioned user equipment may be regarded as a terminal device of the following embodiments.

In some embodiments, the wireless communication system may further include a network management device 130.

Several base stations 120 are connected to the network management device 130, respectively. The network management device 130 may be a core network device in the wireless communication system, for example, the network management device 130 may be a mobility management entity (MME) in an evolved packet core (EPC). Alternatively, the network management device may be other core network devices, such as a serving gateway (SGW), a public data network gateway (PGW), a policy and charging rules function (PCRF) or a home subscriber server (HSS). The implementation form of the network management device 130 is not limited in the embodiment of the present disclosure.

In order to facilitate the understanding of those skilled in the art, the embodiments of the present disclosure set forth multiple implementations to clearly illustrate the technical solutions of the embodiments of the present disclosure. Of course, those skilled in the art may understand that the embodiments provided in the present disclosure may be executed alone, may be executed together with methods of other embodiments in the embodiments of the present disclosure, and may be executed alone or together with some methods in other related technologies, which is not limited in the embodiments of the present disclosure.

In order to better understand the technical solutions described in any embodiment of the present disclosure, firstly, related applications and related scenarios are described.

The rapid development of artificial intelligence (AI) technology provides technical support for intelligent communication networks. The intelligent communication network is an indispensable part, so it is an inevitable trend to apply AI technology to a wireless network.

A machine learning algorithm is one of the most important algorithms in AI technology. The machine learning algorithm may be used to obtain a model through a large number of training data, and events may be predicted through the model. In many fields, accurate prediction results may be obtained through the model obtained by machine learning training.

An ultra dense network (UDN) has become a key technology to meet the needs of high traffic communication. Frequency reuse is realized by densely disposing a large number of wireless devices such as small base stations in the network. In this way, a system capacity of hot spots, such as offices, shopping malls, subways, and the like may be increased to the order of hundreds of times. At the same time, communication continues to develop to high frequency. With the increase of frequency, a coverage of cells is gradually reduced, and a deployment of cells will be denser. The UDN has a wider frequency band and spectrum, a deployment of the UDN is irregular, and types of base stations are diverse compared with an ordinary network system. Therefore, the UDN is more complicated than a traditional cellular network.

In the UDN, a radius of cells is reduced and the cells become denser. In addition, different types of base stations constitute a heterogeneous network, which makes the network environment more complicated. The combination of the above situations brings greater challenges to a mobility management mechanism in the UDN, which mainly includes the following two aspects. On the one hand, since a coverage of cells may overlap, and a signal quality of multiple cells may be relatively close, a terminal may trigger more frequent handovers, and the number of handovers increases, which easily causes a ping-pong handover. On the other hand, when the cell is deployed at high frequency, the signal is easily affected by the environment, and a coverage of cells varies greatly. If the handover is too early or too late, it is easy to lead to the failure of a wireless link.

In an embodiment, a network-controlled management mechanism is adopted. On the one hand, considering the privacy of a terminal, a network side cannot acquire certain types of information of the terminal, such as location information of the terminal. In the UDN, since a deployment of a network is dense and a signal quality of multiple cells is relatively close, firstly, a traditional network-controlled handover scheme cannot configure a most suitable target cell for the terminal, thus being incapable of realizing the optimal performance and affecting the user experience. Secondly, the network side cannot acquire characteristic information such as location and behavior of the terminal, so as to predict changes in channel conditions of the terminal in the future. Therefore, a handover configuration cannot solve the problem of easy ping-pong handover in the UDN. On the other hand, a handover mechanism of a network configuration cannot adapt to the rapidly and dynamically changing network environment in the UDN. Considering that a coverage environment of the UDN is relatively complex, although a signal strength of a target cell in a measurement report is relatively high, when the terminal initiates synchronization and random access to the target cell, the signal strength may drop abruptly due to sharp changes in a channel environment, resulting in handover failure.

In order to realize more optimized mobility management in the UDN and meet the needs of smooth service, it is necessary to further develop a more flexible, intelligent and efficient handover mechanism suitable for the UDN.

Figure 2:
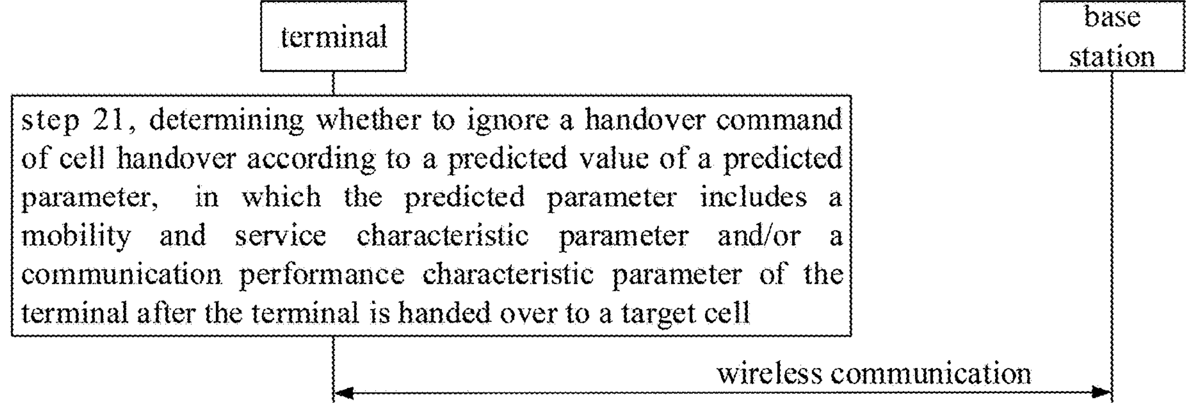
FIG. 2 is a flow chart showing a cell handover method according to an illustrative embodiment.

As shown in FIG. 2, a cell handover method is provided in an embodiment of the present disclosure. The method is performed by a terminal and includes a step as follows.

In step 21, whether to ignore a handover command of cell handover is determined according to a predicted value of a predicted parameter, in which the predicted parameter includes a mobility and service characteristic parameter and/or a communication performance characteristic parameter of the terminal after the terminal is handed over to a target cell.

Here, a terminal may be, but is not limited to, a mobile phone, a wearable device, a vehicle-mounted terminal, a road side unit (RSU), a smart home terminal, an industrial sensing device or the like.

Here, a base station sends a handover command to a terminal. The base station may be an access device for a terminal to access a network. The base station may be various types of base stations, for example, a base station of a $3^{rd}$ generation mobile communication (3G) network, a base station of a $4^{th}$ generation mobile communication (4G) network, a base station of a $5^{th}$ generation mobile communication (5G) network, or a base station of any generation communication system.

In a scenario embodiment, a source base station sends a cell handover request to a target base station according to a measurement report of the terminal. After receiving the cell handover request, the target base station sends a response message to the source base station for the cell handover request. The source base station sends a cell handover command to the terminal after receiving the response message. A cell handover is performed in response to determining that the terminal receives the cell handover command.

In an embodiment, the mobility and service characteristic parameter of the terminal includes a characteristic parameter associated with the mobility of the terminal. For example, the characteristic parameter associated with the mobility of the terminal may be a characteristic parameter associated with a trajectory of the terminal and/or a characteristic associated with a motion direction of the terminal.

In an embodiment, the mobility and service characteristic parameter of the terminal includes a characteristic parameter associated with the service of the terminal. For example, the characteristic parameter associated with the service of the terminal may be a quality of service (QoS) requirement parameter and/or a quality of experience (QoE) requirement parameter.

In an embodiment, the mobility and service characteristic parameter includes one or more of a probability of occurrence of a service with a traffic greater than a traffic threshold, a probability of occurrence of a service with a delay less than a delay threshold, a motion trajectory parameter and/or a motion direction parameter of the terminal, a quality of service (QoS) requirement parameter, and a quality of experience (QoE) requirement parameter.

In an embodiment, a predicted value of the mobility and service characteristic parameter may be a parameter value of the mobility and service characteristic parameter within a predetermined period.

Here, the predetermined period may be a period associated with the prediction of the parameter value of the mobility and service characteristic parameter. Here, the network may configure the predetermined period for the terminal in advance. The terminal may also determine the predetermined period according to a predetermined rule. For example, the predetermined period may be a period counted from a predicted time point.

In an embodiment, in case that the terminal needs to predict a parameter value of a mobility and service characteristic parameter of a candidate cell 1 (for example, a probability of occurrence of a service with a traffic greater than a traffic threshold within the predetermined period), and the network configures a terminal with a parameter value of a mobility and service characteristic parameter within a period A that needs to be predicted, that is, the predetermined period is the period A, the terminal predicts the parameter value of the mobility and service characteristic parameter of the terminal in the candidate cell 1 within the period A. Here, the predetermined period may be indicated by a start moment and an end moment. For example, the predetermined period corresponds to a moment a to a moment b. The predetermined period may also be indicated by the start moment and a duration. For example, the start moment corresponding to the predetermined period is the moment a, and a corresponding duration is c.

In an embodiment, average traffics of different types of services are different. For example, an average traffic of high-definition video services is greater than that of voice services.

In an embodiment, average delays of different types of services are different. For example, a wireless communication delay of an autonomous vehicle is greater than that of a meter reading service.

In an embodiment, QoS requirements and/or QoE requirements of different types of services are different. For example, a QoS requirement of a wireless communication of a telemedicine control service is different from that of a voice service. Here, the QoS requirement may include at least one of a bandwidth, a delay, and a packet loss rate.

In an embodiment, the communication performance characteristic parameter includes a characteristic parameter associated with a wireless communication of the terminal, for example, a probability of cell handover failure, a probability of wireless communication interruption, and a probability of occurrence of ping-pong handover.

In an embodiment, the communication performance characteristic parameter includes one or more of a probability of cell handover failure, a probability of wireless communication interruption, a probability of occurrence of ping-pong handover, a probability of occurrence of a QoS and/or a QoE not meeting a predetermined requirement, a resident time in the target cell, a quality of a wireless communication, a data transmission rate, a data transmission delay, and a recommendation degree of the target cell.

In an embodiment, a predicted value of the communication performance characteristic parameter may be a parameter value of the communication performance characteristic parameter within a predetermined period.

Here, the predetermined period may be a period associated with the prediction of the parameter value of the communication performance characteristic parameter. Here, the network may configure the predetermined period for the terminal in advance. The terminal may also determine the predetermined period according to a predetermined rule. For example, the predetermined period may be a period counted from a predicted time point.

In an embodiment, it is necessary to predict a parameter value of a communication performance characteristic parameter of a candidate cell 1 (for example, a probability of occurrence of ping-pong handover), and the network configures a terminal with a parameter value of a communication performance characteristic parameter within a period B that needs to be predicted, that is, the predetermined period is the period B, then the terminal predicts the parameter value of the communication performance characteristic parameter of the terminal in the candidate cell 1 within the period B. Here, the predetermined period may be indicated by a start moment and an end moment. For example, the predetermined period corresponds to a moment a to a moment b. The predetermined period may also be indicated by the start moment and a duration. For example, the start moment corresponding to the predetermined period is the moment a, and a corresponding duration is c.

In an embodiment, in response to a wireless communication quality of the cell being less than a quality threshold, the probability of cell handover failure and/or the probability of wireless communication interruption is greater than a probability threshold.

In an embodiment, in response to overlapping coverage of different cells, the probability of occurrence of ping-pong handover is greater than the probability threshold. Here, since a signal quality of multiple cells is relatively close, the terminal may trigger more frequent handovers, and the number of handovers increases, which easily causes the ping-pong handover. Here, the ping-pong handover may be an event that the terminal is handed over back to a source cell within the predefined time after being handed over from the source cell to the target cell, in which the number of times of occurrences of the event is more than one.

In an embodiment, the quality of the wireless communication may be at least one of a reference signal receiving power (RSRP), a reference signal receiving quality (RSRQ), and a signal to interference plus noise ratio (SINR). Here, a value of the quality of the wireless communication may be an average value and/or a peak value of the quality of the wireless communication.

In an embodiment, a value of the data transmission rate may be an average value and/or a peak value of the data transmission rate.

In an embodiment, a value of the data transmission delay may be an average value, a minimum value and/or a maximum value of the data transmission delay.

In an embodiment, a recommendation degree of a candidate cell may be predicted by one or more parameters included in the mobility and service characteristic parameter and the communication performance characteristic parameter. Here, a recommendation degree of a candidate cell may be predicted based on the parameters included in the mobility and service characteristic parameter and the communication performance characteristic parameter as well as a machine learning algorithm.

In an embodiment, a recommendation degree of a cell is determined according to a predicted value of multiple predicted parameters. In an embodiment, a recommendation degree of a cell is determined according to a weighted predicted value of multiple predicted parameters. For example, in case that a value of the quality of service (QoS) requirement parameter within the predetermined period is a, the probability of cell handover failure is b, the probability of occurrence of ping-pong handover is c, and weighting coefficients are x, y, and z, respectively, the recommendation degree of the cell may be a weighted predicted value N of a, b and c. Here, $N=ax+by+cz$. Here, the weighting coefficients for acquiring the weighted predicted value may be preset.

In an embodiment, the predicted value of the predicted parameter may be determined by using the machine learning algorithm based on a value of a historical predicted parameter of the target cell. It is determined whether to ignore the handover command of cell handover according to the predicted value of the predicted parameter. Here, the machine learning algorithm may be trained by using the value of the historical predicted parameter of the target cell within a historical period to obtain a trained machine learning algorithm model. The predicted value of the predicted parameter is generated by using the machine learning algorithm model.

In an embodiment, in response to the predicted value of the predicted parameter being greater than or equal to a reference threshold, it is determined to ignore the handover command of cell handover. For example, in response to the data transmission delay being greater than the delay threshold, it is determined to ignore the handover command of cell handover. In an embodiment, in response to the predicted value of the predicted parameter being less than the reference threshold, it is determined not to ignore the handover command of cell handover. For example, in response to the probability of occurrence of ping-pong handover being less than the probability threshold, it is determined not to ignore the handover command of cell handover. Here, not to ignore the handover command of cell handover may be executing the handover command. Here, the reference threshold may be a configuration received by the terminal from the base station, or may be preset and stored in the terminal.

In an embodiment, it is determined whether to ignore the handover command of cell handover according to the predicted value of the mobility and service characteristic parameter of the terminal after the terminal is handed over to the target cell which is determined by using the machine learning algorithm. In an embodiment, in response to determining that a predicted value of a probability of occurrence of a service with a traffic greater than the traffic threshold within the predetermined period indicated by the mobility and service characteristic parameter of the terminal after the terminal is handed over to the target cell which is determined by using the machine learning algorithm is greater than the probability threshold, it is determined to ignore the handover command of cell handover. In an embodiment, in response to determining that a predicted value of a probability of occurrence of a service with a delay less than the delay threshold within the predetermined period indicated by the mobility and service characteristic parameter of the terminal after the terminal is handed over to the target cell which is determined by using the machine learning algorithm is greater than the probability threshold, it is determined not to ignore the handover command of cell handover.

In an embodiment, it is determined whether to ignore the handover command of cell handover according to the predicted value of the communication performance characteristic parameter of the terminal after the terminal is handed over to the target cell which is determined by using the machine learning algorithm. In an embodiment, in response to determining that a predicted value of a probability of cell handover failure indicated by the communication performance characteristic parameter of the terminal after the terminal is handed over to the target cell which is determined by using the machine learning algorithm is greater than the probability threshold, it is determined to ignore the handover command of cell handover. In an embodiment, in response to determining that the predicted value of the data transmission rate indicated by the communication performance characteristic parameter of the terminal after the terminal is handed over to the target cell which is determined by using the machine learning algorithm is greater than the probability threshold, it is determined not to ignore the handover command of cell handover.

In an embodiment, it is determined whether to ignore the handover command of cell handover according to the predicted value of the mobility and service characteristic parameter of the terminal and the predicted value of the communication performance characteristic parameter of the terminal after the terminal is handed over to the target cell which is determined by using the machine learning algorithm. In an embodiment, in response to determining that a predicted value of a probability of occurrence of a service with a traffic greater than the traffic threshold within the predetermined period indicated by the mobility and service characteristic parameter of the terminal after the terminal is handed over to the target cell which is determined by using the machine learning algorithm is greater than the probability threshold, and a predicted value of a probability of cell handover failure indicated by the communication performance characteristic parameter of the terminal after the terminal is handed over to the target cell which is determined by using the machine learning algorithm is greater than the probability threshold, it is determined to ignore the handover command of cell handover. In an embodiment, in response to determining that a predicted value of a probability of occurrence of a service with a delay less than the delay threshold within the predetermined period indicated by the mobility and service characteristic parameter of the terminal after the terminal is handed over to the target cell which is determined by using the machine learning algorithm is greater than the probability threshold, and the predicted value of the data transmission rate indicated by the communication performance characteristic parameter of the terminal after the terminal is handed over to the target cell which is determined by using the machine learning algorithm is greater than the probability threshold, it is determined not to ignore the handover command of cell handover.

In the embodiment of the present disclosure, it is determined whether to ignore the handover command of cell handover according to the predicted value of the predicted parameter, in which the predicted parameter includes the mobility and service characteristic parameter and/or the communication performance characteristic parameter of the terminal after the terminal is handed over to the target cell. Here, since the terminal may determine whether to ignore the handover command of cell handover according to the predicted value, and the predicted value may be adapted to the mobility and service characteristic and/or the communication performance characteristic of the terminal after the terminal is handed over to the target cell, compared with a manner in which cell handover must be performed after receiving a handover command, it may be adapted to the mobility and service characteristic and/or the communication performance characteristic of the terminal after the terminal is handed over to the target cell, making a wireless communication more reliable.

It is to be noted that those skilled in the art may understand that the methods provided in the embodiments of the present disclosure may be executed alone, or may be executed together with some methods in the embodiments of the present disclosure or some methods in related technologies.

Figure 3:
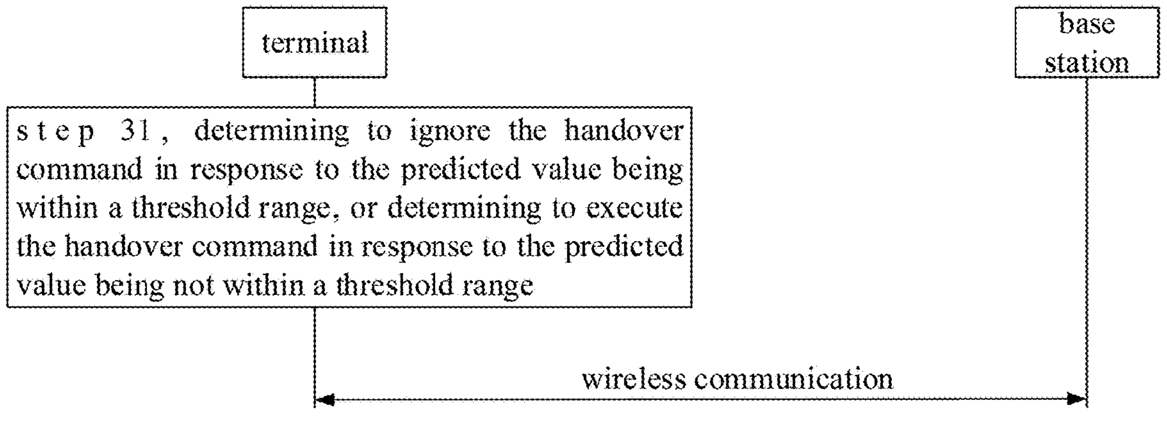
FIG. 3 is a flow chart showing a cell handover method according to an illustrative embodiment.

As shown in FIG. 3, a cell handover method is provided in an embodiment of the present disclosure. The method is performed by a terminal and includes a step as follows.

In step 31, it is determined to ignore the handover command, in response to the predicted value being within a threshold range, or it is determined to execute the handover command, in response to the predicted value being not within a threshold range.

In an embodiment, the terminal receives configuration information carrying the threshold range from the base station. In another embodiment, the threshold range is preset and information within the threshold range is pre-stored in the terminal.

In an embodiment, it is determined that the predicted value is within the threshold range, in response to the predicted value being less than a value indicated by the information within the threshold range; and it is determined that the predicted value is not within the threshold range, in response to the predicted value being greater than a value indicated by the information within the threshold range. In another embodiment, it is determined that the predicted value is within the threshold range, in response to the predicted value being greater than a value indicated by the information within the threshold range; and it is determined that the predicted value is not within the threshold range, in response to the predicted value being less than a value indicated by the information within the threshold range.

In an embodiment, the handover command is not executed in response to the predicted value being within the threshold range. Alternatively, it is determined to execute the handover command, in response to the predicted value being not within the threshold range.

In an embodiment, it is determined to ignore the handover command, in response to determining that the handover command is received and the predicted value is within the threshold range. Alternatively, it is determined to execute the handover command, in response to determining that the handover command is received and the predicted value is not within the threshold range.

It is to be noted that those skilled in the art may understand that the methods provided in the embodiments of the present disclosure may be executed alone, or may be executed together with some methods in the embodiments of the present disclosure or some methods in related technologies.

Figure 4:
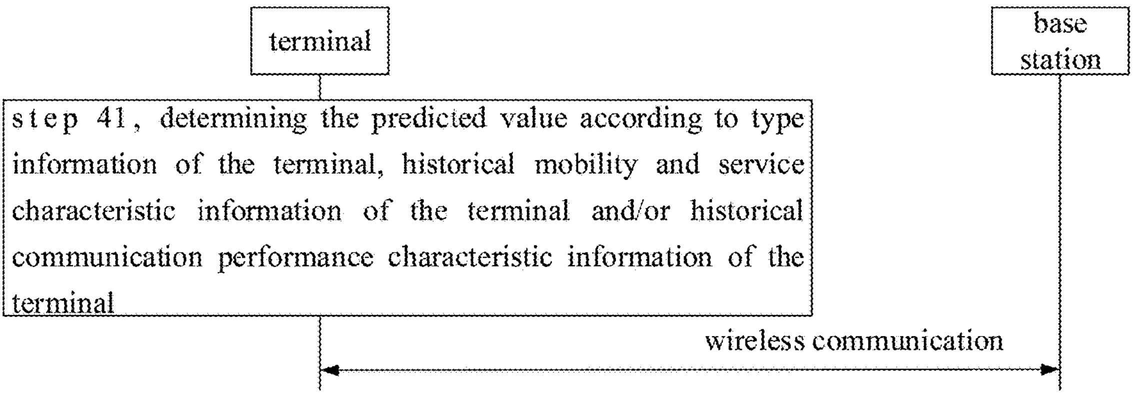
FIG. 4 is a flow chart showing a cell handover method according to an illustrative embodiment.

As shown in FIG. 4, a cell handover method is provided in an embodiment of the present disclosure. The method is performed by a terminal and includes a step as follows.

In step 41, the predicted value is determined according to type information of the terminal, historical mobility and service characteristic information of the terminal and/or historical communication performance characteristic information of the terminal.

In an embodiment, the type information of the terminal may be information associated with a motion characteristic, a data transmission rate and/or a motion area of the terminal. For example, for a type A of the terminal, a motion rate is a meters per second, the data transmission rate is b megabits per second, and the motion area is an area c.

In an embodiment, the historical mobility and service characteristic information of the terminal includes a characteristic parameter associated with the mobility of the terminal and/or a characteristic parameter associated with the service of the terminal within a historical period. For example, the characteristic parameter associated with the mobility of the terminal may be a characteristic parameter associated with a trajectory of the terminal and/or a characteristic parameter associated with a motion direction of the terminal. For example, the characteristic parameter associated with the service of the terminal may be a quality of service (QoS) requirement parameter and a quality of experience (QoE) requirement parameter.

In an embodiment, the historical mobility and service characteristic information of the terminal includes a value of at least one of the following parameters within the historical period: a probability of occurrence of a service with a traffic greater than a traffic threshold, a probability of occurrence of a service with a delay less than a delay threshold, a motion trajectory parameter and/or a motion direction parameter of the terminal, a quality of service (QoS) requirement parameter, and a quality of experience (QoE) requirement parameter.

In an embodiment, the historical communication performance characteristic parameter of the terminal includes a characteristic parameter associated with a wireless communication of the terminal within the historical period, for example, a probability of cell handover failure, a probability of wireless communication interruption, and a probability of occurrence of ping-pong handover.

In an embodiment, the historical communication performance characteristic information of the terminal includes at least one of the following information within the historical period: a probability of cell handover failure, a probability of wireless communication interruption, a probability of occurrence of ping-pong handover, a probability of occurrence of a QoS and/or a QoE not meeting a predetermined requirement, a resident time in the target cell, a quality of a wireless communication, a data transmission rate, a data transmission delay, and a recommendation degree of the target cell.

In an embodiment, a duration of the historical period is determined according to the required accuracy of the predicted value. The duration of the historical period is greater than a period threshold, in response to determining that the required accuracy of the predicted value is greater than an accuracy threshold. The duration of the historical period is less than a period threshold, in response to determining that the required accuracy of the predicted value is less than an accuracy threshold.

In an embodiment, the predicted value is determined according to the type information of the terminal, the historical mobility and service characteristic information of the terminal and/or the historical communication performance characteristic information of the terminal by using the machine learning algorithm.

In an embodiment, a probability of occurrence of a service with a traffic greater than the traffic threshold within a period B after the terminal accesses a target cell to be evaluated is determined according to a probability of occurrence of a service with a traffic greater than the traffic threshold within a period A indicated by the historical mobility and service characteristic information of the terminal within the period A by using the machine learning algorithm.

In an embodiment, a data transmission rate within a period B after the terminal accesses a target cell to be evaluated is determined according to a data transmission rate within a period A indicated by the communication performance characteristic information of the terminal within the period A by using the machine learning algorithm.

In an embodiment, the historical period may be a period configured by the base station. For example, the historical period may be a period B1 during the day and/or a period W1 at night configured by the base station. Here, the historical mobility and service parameters and/or the historical communication performance characteristic parameters within different periods are different. Here, the historical period may be indicated by a start moment and an end moment. For example, the historical period corresponds to a moment a to a moment b. The historical period may also be indicated by the start moment and a duration. For example, the start moment corresponding to the historical period is the moment a, and a corresponding duration is c.

It is to be noted that those skilled in the art may understand that the methods provided in the embodiments of the present disclosure may be executed alone, or may be executed together with some methods in the embodiments of the present disclosure or some methods in related technologies.

Figure 5:
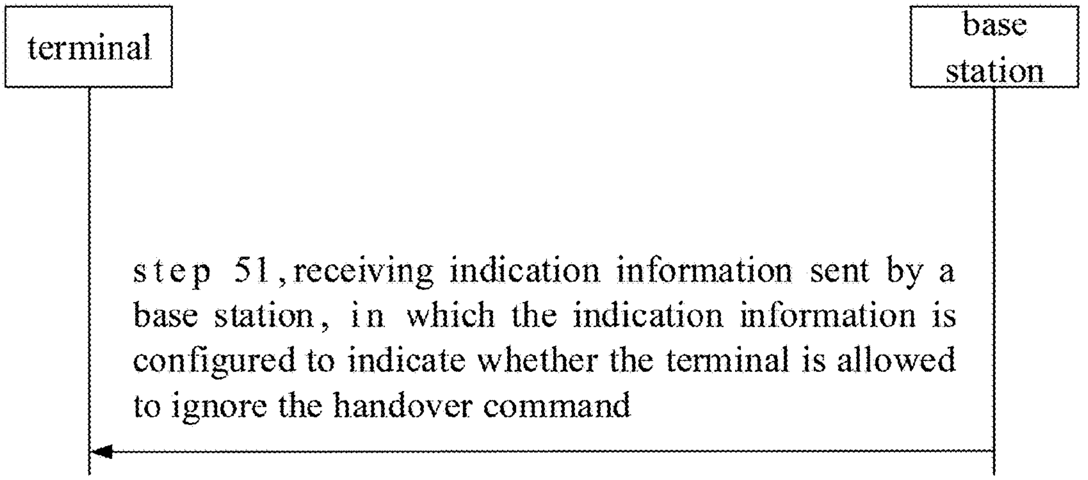
FIG. 5 is a flow chart showing a cell handover method according to an illustrative embodiment.

As shown in FIG. 5, a cell handover method is provided in an embodiment of the present disclosure. The method is performed by a terminal and includes a step as follows.

In step 51, indication information sent by a base station is received, in which the indication information is configured to indicate whether the terminal is allowed to ignore the handover command.

In an embodiment, the base station sends the indication information to the terminal, in response to determining that a radio resource control (RRC) connection is established between the terminal and the base station.

In an embodiment, the terminal receives the indication information sent by the base station in one of the following ways: receiving the indication information sent by the base station through a system message, receiving the indication information sent by the base station through a random access message of a random access procedure of the terminal, or receiving the indication information sent by the base station through an RRC message.

In an embodiment, the terminal can ignore the handover command, in response to determining that the indication information is configured to indicate that the terminal is allowed to ignore the handover command. The terminal cannot ignore the handover command, in response to determining that the indication information is configured to indicate that the terminal is not allowed to ignore the handover command.

Here, the terminal ignoring the handover command may mean that the handover command is not executed after the handover command is received. The terminal not ignoring the handover command may mean that the handover command is executed after the handover command is received.

It is to be noted that those skilled in the art may understand that the methods provided in the embodiments of the present disclosure may be executed alone, or may be executed together with some methods in the embodiments of the present disclosure or some methods in related technologies.

Figure 6:
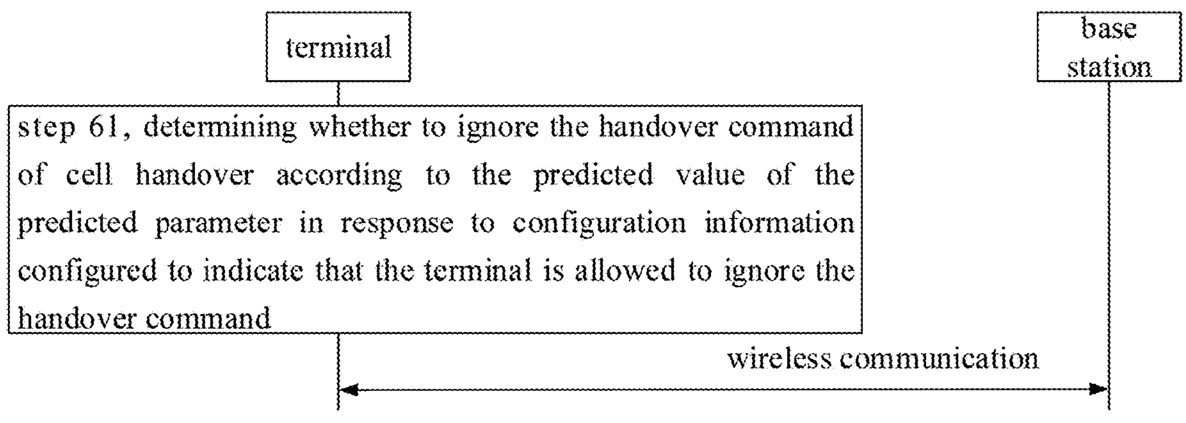
FIG. 6 is a flow chart showing a cell handover method according to an illustrative embodiment.

As shown in FIG. 6, a cell handover method is provided in an embodiment of the present disclosure. The method is performed by a terminal and includes a step as follows.

In step 61, it is determined whether to ignore the handover command of cell handover according to the predicted value of the predicted parameter in response to configuration information configured to indicate that the terminal is allowed to ignore the handover command.

In an embodiment, the terminal cannot ignore the handover command of cell handover, in response to determining that the configuration information is configured to indicate that the terminal is not allowed to ignore the handover command.

In an embodiment, it is determined to ignore the handover command of cell handover, in response to determining that the configuration information is configured to indicate that the terminal is allowed to ignore the handover command and the predicted value of the predicted parameter is greater than or equal to the reference threshold. For example, it is determined to ignore the handover command of cell handover, in response to determining that the configuration information is configured to indicate that the terminal is allowed to ignore the handover command and the data transmission delay is greater than the delay threshold. In an embodiment, it is determined not to ignore the handover command of cell handover, in response to determining that the configuration information is configured to indicate that the terminal is allowed to ignore the handover command and the predicted value of the predicted parameter is less than the reference threshold. For example, it is determined not to ignore the handover command of cell handover, in response to determining that the configuration information is configured to indicate that the terminal is allowed to ignore the handover command and the probability of occurrence of ping-pong handover is less than the probability threshold. Here, not to ignore the handover command of cell handover may be executing the handover command. Here, the reference threshold may be a configuration received by the terminal from the base station, or may be preset and stored in the terminal.

In an embodiment, in response to determining that the configuration information is configured to indicate that the terminal is allowed to ignore the handover command, it is determined whether to ignore the handover command of cell handover according to the predicted value of the mobility and service characteristic parameter of the terminal after the terminal is handed over to the target cell which is determined by using the machine learning algorithm. In an embodiment, it is determined to ignore the handover command of cell handover, in response to determining that the configuration information is configured to indicate that the terminal is allowed to ignore the handover command and a predicted value of a probability of occurrence of a service with a traffic greater than the traffic threshold within the predetermined period indicated by the mobility and service characteristic parameter of the terminal after the terminal is handed over to the target cell which is determined by the machine learning algorithm is greater than the probability threshold. In an embodiment, it is determined not to ignore the handover command of cell handover, in response to determining that the configuration information is configured to indicate that the terminal is allowed to ignore the handover command and a predicted value of a probability of occurrence of a service with a delay less than the delay threshold within the predetermined period indicated by the mobility and service characteristic parameter of the terminal after the terminal is handed over to the target cell which is determined by using the machine learning algorithm is greater than the probability threshold.

In an embodiment, in response to determining that the configuration information is configured to indicate that the terminal is allowed to ignore the handover command, it is determined whether to ignore the handover command of cell handover according to the predicted value of the communication performance characteristic parameter of the terminal after the terminal is handed over to the target cell which is determined by using the machine learning algorithm. In an embodiment, it is determined to ignore the handover command of cell handover, in response to determining that the configuration information is configured to indicate that the terminal is allowed to ignore the handover command and a predicted value of a probability of cell handover failure indicated by the communication performance characteristic parameter of the terminal after the terminal is handed over to the target cell which is determined by using the machine learning algorithm is greater than the probability threshold. In an embodiment, it is determined not to ignore the handover command of cell handover, in response to determining that the configuration information is configured to indicate that the terminal is allowed to ignore the handover command and the predicted value of the data transmission rate indicated by the communication performance characteristic parameter of the terminal after the terminal is handed over to the target cell which is determined by using the machine learning algorithm is greater than the probability threshold.

It is to be noted that those skilled in the art may understand that the methods provided in the embodiments of the present disclosure may be executed alone, or may be executed together with some methods in the embodiments of the present disclosure or some methods in related technologies.

Figure 7:
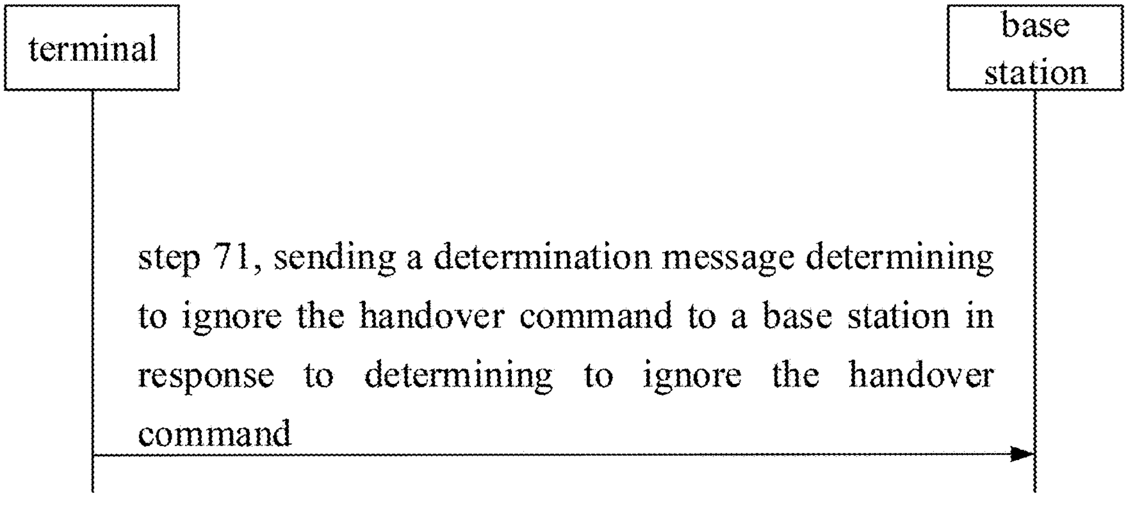
FIG. 7 is a flow chart showing a cell handover method according to an illustrative embodiment.

As shown in FIG. 7, a cell handover method is provided in an embodiment of the present disclosure. The method is performed by a terminal and includes a step as follows.

In step 71, a determination message determining to ignore the handover command is sent to a base station in response to determining to ignore the handover command.

In an embodiment, it is determined to ignore the handover command of cell handover, in response to the predicted value of the predicted parameter being greater than or equal to the reference threshold. For example, it is determined to ignore the handover command of cell handover, in response to the data transmission delay being greater than the delay threshold. Here, the reference threshold and the delay threshold may be configured by the base station.

In an embodiment, it is determined to ignore the handover command of cell handover, in response to determining that a predicted value of a probability of occurrence of a service with a traffic greater than the traffic threshold within the predetermined period indicated by the mobility and service characteristic parameter of the terminal after the terminal is handed over to the target cell which is determined by using the machine learning algorithm is greater than the probability threshold.

In an embodiment, it is determined to ignore the handover command of cell handover, in response to determining that a predicted value of a probability of cell handover failure indicated by the communication performance characteristic parameter of the terminal after the terminal is handed over to the target cell which is determined by using the machine learning algorithm is greater than the probability threshold.

In an embodiment, an acknowledgement message indicating authorization may be sent to the terminal, in response to determining that the base station receives the determination message determining to ignore the handover command, so that the terminal may ignore the handover command after receiving the acknowledgement message. In another embodiment, an acknowledgement message indicating authorization may not be sent to the terminal, in response to determining that the base station receives the determination message determining to ignore the handover command, so that the terminal will not execute the handover command without receiving the acknowledgement message. In yet another embodiment, an acknowledgement message indicating non-authorization may be sent to the terminal, in response to determining that the base station receives the determination message determining to ignore the handover command, so that the terminal may ignore the handover command after receiving the acknowledgement message.

It is to be noted that those skilled in the art may understand that the methods provided in the embodiments of the present disclosure may be executed alone, or may be executed together with some methods in the embodiments of the present disclosure or some methods in related technologies.

Figure 8:
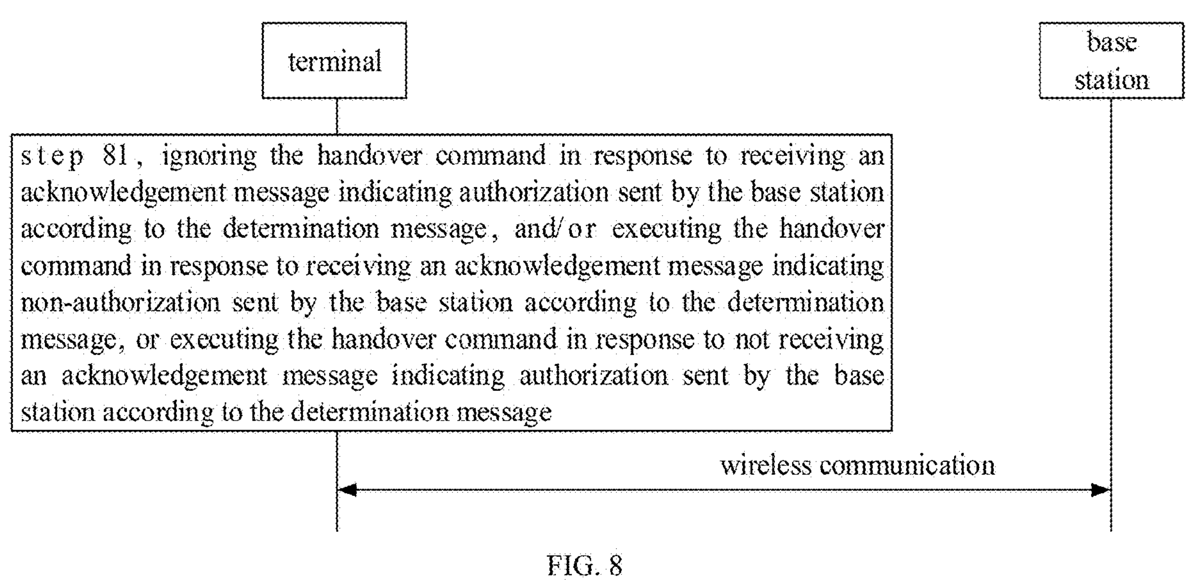
FIG. 8 is a flow chart showing a cell handover method according to an illustrative embodiment.

As shown in FIG. 8, a cell handover method is provided in an embodiment of the present disclosure. The method is performed by a terminal and includes a step as follows.

In step 81, the handover command is ignored in response to receiving an acknowledgement message indicating authorization sent by the base station according to the determination message, and/or the handover command is executed in response to receiving an acknowledgement message indicating non-authorization sent by the base station according to the determination message, or the handover command is executed in response to not receiving an acknowledgement message indicating authorization sent by the base station according to the determination message.

In an embodiment, the terminal sends the determination message determining to ignore the handover command to the base station. In response to determining that the base station receives the determination message determining to ignore the handover command, the acknowledgement message indicating authorization may be sent to the terminal. In response to determining that the terminal receives the acknowledgement message indicating authorization sent by the base station according to the determination message, the terminal ignores the handover command.

In an embodiment, the terminal sends the determination message determining to ignore the handover command to the base station. In response to determining that the base station receives the determination message determining to ignore the handover command, the acknowledgement message indicating non-authorization may be sent to the terminal. In response to determining that the terminal receives the acknowledgement message indicating non-authorization sent by the base station according to the determination message, the terminal executes the handover command.

In an embodiment, the terminal sends the determination message determining to ignore the handover command to the base station. In response to determining that the base station receives the determination message determining to ignore the handover command, the acknowledgement message indicating authorization may not be sent to the terminal. In response to determining that the terminal does not receive the acknowledgement message indicating authorization sent by the base station according to the determination message, the terminal executes the handover command.

It is to be noted that those skilled in the art may understand that the methods provided in the embodiments of the present disclosure may be executed alone, or may be executed together with some methods in the embodiments of the present disclosure or some methods in related technologies.

Figures 9, 10:
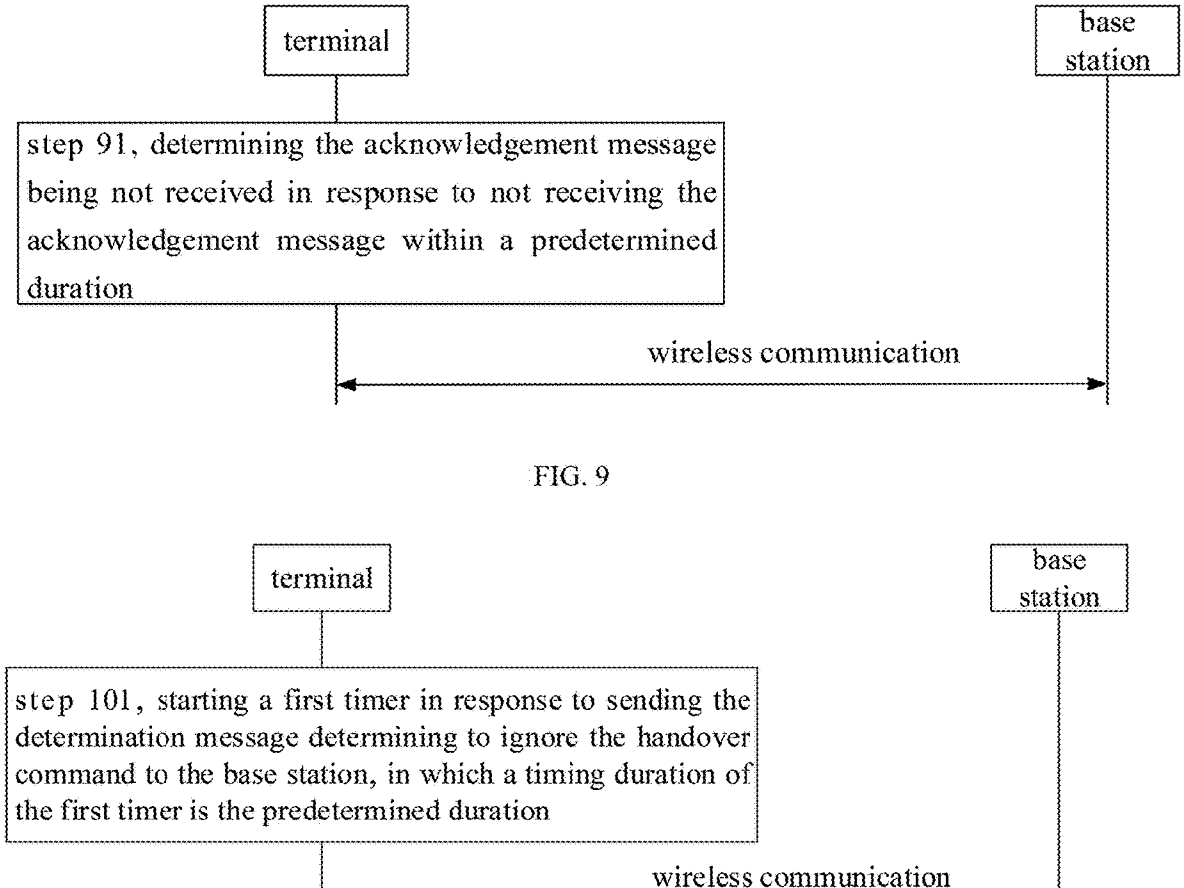
FIG. 9 is a flow chart showing a cell handover method according to an illustrative embodiment.
FIG. 10 is a flow chart showing a cell handover method according to an illustrative embodiment.

As shown in FIG. 9, a cell handover method is provided in an embodiment of the present disclosure. The method is performed by a terminal and includes a step as follows.

In step 91, it is determined that the acknowledgement message is not received in response to not receiving the acknowledgement message within a predetermined duration.

In an embodiment, it is determined that the acknowledgement message is received in response to receiving the acknowledgement message within a predetermined duration.

In an embodiment, it is determined that the acknowledgement message is not received, in response to not receiving the acknowledgement message within the predetermined duration after the terminal sends the determination message determining to ignore the handover command to the base station.

In an embodiment, the predetermined duration may be determined according to a required delay.

In an embodiment, it is determined that the predetermined duration is less than a duration threshold, in response to the required delay being less than the delay threshold. It is determined that the predetermined duration is greater than the duration threshold, in response to the required delay being greater than the delay threshold.

It is to be noted that those skilled in the art may understand that the methods provided in the embodiments of the present disclosure may be executed alone, or may be executed together with some methods in the embodiments of the present disclosure or some methods in related technologies.

As shown in FIG. 10, a cell handover method is provided in an embodiment of the present disclosure. The method is performed by a terminal and includes a step as follows.

In step 101, a first timer is started in response to sending the determination message determining to ignore the handover command to the base station, in which a timing duration of the first timer is the predetermined duration.

In an embodiment, the predetermined duration may be determined according to the required delay.

In an embodiment, it is determined that the predetermined duration is less than the duration threshold, in response to the required delay being less than the delay threshold. It is determined that the predetermined duration is greater than the duration threshold, in response to the required delay being greater than the delay threshold.

It is to be noted that those skilled in the art may understand that the methods provided in the embodiments of the present disclosure may be executed alone, or may be executed together with some methods in the embodiments of the present disclosure or some methods in related technologies.

As shown in FIG. 11, a cell handover method is provided in an embodiment of the present disclosure. The method is performed by a terminal and includes a step as follows.

In step 111, it is determined that the acknowledgement message is not received in response to not receiving the acknowledgement message before a timing of the first timer expires.

In an embodiment, the first timer is started in response to sending the determination message determining to ignore the handover command to the base station, in which the timing duration of the first timer is the predetermined duration. It is determined that the acknowledgement message is not received in response to not receiving the acknowledgement message before the timing of the first timer expires.

In an embodiment, the predetermined duration may be determined according to the required delay.

In an embodiment, it is determined that the predetermined duration is less than the duration threshold, in response to the required delay being less than the delay threshold. It is determined that the predetermined duration is greater than the duration threshold, in response to the required delay being greater than the delay threshold.

It is to be noted that those skilled in the art may understand that the methods provided in the embodiments of the present disclosure may be executed alone, or may be executed together with some methods in the embodiments of the present disclosure or some methods in related technologies.

As shown in FIG. 12, a cell handover method is provided in an embodiment of the present disclosure. The method is performed by a terminal and includes a step as follows.

In step 121, configuration information sent by a base station is received, in which the configuration information includes at least one of indication information indicating whether the terminal is allowed to ignore the handover command, threshold range information indicating a threshold range of the predicted value, and the predicted parameter.

In an embodiment, the configuration information sent by the base station is received, in response to determining that a radio resource control (RRC) connection is established between the terminal and the base station.

In an embodiment, the terminal receives the configuration information sent by the base station in one of the following ways: receiving the configuration information sent by the base station through a system message, receiving the configuration information sent by the base station through a random access message of a random access procedure of the terminal, and receiving the configuration information sent by the base station through an RRC message.

In an embodiment, the terminal can ignore the handover command, in response to determining that the indication information is configured to indicate that the terminal is allowed to ignore the handover command. The terminal cannot ignore the handover command, in response to determining that the indication information is configured to indicate that the terminal is not allowed to ignore the handover command.

Here, the terminal ignoring the handover command may mean that the handover command is not executed after the handover command is received. The terminal not ignoring the handover command may mean that the handover command is executed after the handover command is received.

In an embodiment, it is determined that the predicted value is within the threshold range, in response to the predicted value being less than a value indicated by the information within the threshold range. It is determined that the predicted value is not within the threshold range, in response to the predicted value being greater than a value indicated by the information within the threshold range. In another embodiment, it is determined that the predicted value is within the threshold range, in response to the predicted value being greater than a value indicated by the information within the threshold range. It is determined that the predicted value is not within the threshold range, in response to the predicted value being less than a value indicated by the information within the threshold range.

In an embodiment, it is determined to ignore the handover command, in response to determining that the handover command is received and the predicted value is within the threshold range. Alternatively, it is determined to execute the handover command, in response to determining that the handover command is received and the predicted value is not within the threshold range.

In an embodiment, the predicted parameter includes one or more of the following mobility and service characteristic parameters: a probability of occurrence of a service with a traffic greater than a traffic threshold, a probability of occurrence of a service with a delay less than a delay threshold, a motion trajectory parameter and/or a motion direction parameter of the terminal, a quality of service (QoS) requirement parameter, and a quality of experience (QoE) requirement parameter.

In an embodiment, the predicted parameter includes one or more of the following communication performance characteristic parameters: a probability of cell handover failure, a probability of wireless communication interruption, a probability of occurrence of ping-pong handover, a probability of occurrence of a QoS and/or a QoE not meeting a predetermined requirement, a resident time in the target cell, a quality of a wireless communication, a data transmission rate, a data transmission delay, and a recommendation degree of the target cell.

It is to be noted that those skilled in the art may understand that the methods provided in the embodiments of the present disclosure may be executed alone, or may be executed together with some methods in the embodiments of the present disclosure or some methods in related technologies.

As shown in FIG. 13, a cell handover method is provided in an embodiment of the present disclosure. The method is performed by a base station and includes a step as follows.

In step 131, a determination message sent by a terminal to determine to ignore a handover command is received, in which the determination message is a message sent in response to the terminal determining to ignore the handover command of cell handover according to a predicted value of a predicted parameter, and the predicted parameter includes a mobility and service characteristic parameter and/or a communication performance characteristic parameter of the terminal after the terminal is handed over to a target cell.

Here, a terminal may be, but is not limited to, a mobile phone, a wearable device, a vehicle-mounted terminal, a road side unit (RSU), a smart home terminal, an industrial sensing device or the like.

Here, a base station sends a handover command to a terminal. The base station may be an access device for a terminal to access a network. The base station may be various types of base stations, for example, a base station of a $3^{rd}$ generation mobile communication (3G) network, a base station of a $4^{th}$ generation mobile communication (4G) network, a base station of a $5^{th}$ generation mobile communication (5G) network, or a base station of any generation communication system.

In a scenario embodiment, a source base station sends a cell handover request to a target base station according to a measurement report of the terminal. After receiving the cell handover request, the target base station sends a response message to the source base station for the cell handover request. The source base station sends a cell handover command to the terminal after receiving the response message. A cell handover is performed in response to determining that the terminal receives the cell handover command.

In an embodiment, the mobility and service characteristic parameter of the terminal includes a characteristic parameter associated with the mobility of the terminal. For example, the characteristic parameter associated with the mobility of the terminal may be a characteristic parameter associated with a trajectory of the terminal and/or a characteristic associated with a motion direction of the terminal.

In an embodiment, the mobility and service characteristic parameter of the terminal includes a characteristic parameter associated with the service of the terminal. For example, the characteristic parameter associated with the service of the terminal may be a quality of service (QoS) requirement parameter and/or a quality of experience (QoE) requirement parameter.

In an embodiment, the mobility and service characteristic parameter includes one or more of a probability of occurrence of a service with a traffic greater than a traffic threshold, a probability of occurrence of a service with a delay less than a delay threshold, a motion trajectory parameter and/or a motion direction parameter of the terminal, a quality of service (QoS) requirement parameter, and a quality of experience (QoE) requirement parameter.

In an embodiment, a predicted value of the mobility and service characteristic parameter may be a parameter value of the mobility and service characteristic parameter within a predetermined period.

Here, the predetermined period may be a period associated with the prediction of the parameter value of the mobility and service characteristic parameter. Here, the network may configure the predetermined period for the terminal in advance. The terminal may also determine the predetermined period according to a predetermined rule. For example, the predetermined period may be a period counted from a predicted time point.

In an embodiment, in case that the terminal needs to predict a parameter value of a mobility and service characteristic parameter of a candidate cell 1 (for example, a probability of occurrence of a service with a traffic greater than a traffic threshold within the predetermined period), and the network configures a terminal with a parameter value of a mobility and service characteristic parameter within a period A that needs to be predicted, that is, the predetermined period is the period A, the terminal predicts the parameter value of the mobility and service characteristic parameter of the terminal in the candidate cell 1 within the period A. Here, the predetermined period may be indicated by a start moment and an end moment. For example, the predetermined period corresponds to a moment a to a moment b. The predetermined period may also be indicated by the start moment and a duration. For example, the start moment corresponding to the predetermined period is the moment a, and a corresponding duration is c.

In an embodiment, average traffics of different types of services are different. For example, an average traffic of high-definition video services is greater than that of voice services.

In an embodiment, average delays of different types of services are different. For example, a wireless communication delay of an autonomous vehicle is greater than that of a meter reading service.

In an embodiment, QoS requirements and/or QoE requirements of different types of services are different. For example, a QoS requirement of a wireless communication of a telemedicine control service is different from that of a voice service. Here, the QoS requirement may include at least one of a bandwidth, a delay, and a packet loss rate.

In an embodiment, the communication performance characteristic parameter includes a characteristic parameter associated with a wireless communication of the terminal, for example, a probability of cell handover failure, a probability of wireless communication interruption, and a probability of occurrence of ping-pong handover.

In an embodiment, the communication performance characteristic parameter includes one or more of a probability of cell handover failure, a probability of wireless communication interruption, a probability of occurrence of ping-pong handover, a probability of occurrence of a QoS and/or a QoE not meeting a predetermined requirement, a resident time in the target cell, a quality of a wireless communication, a data transmission rate, a data transmission delay, and a recommendation degree of the target cell.

In an embodiment, a predicted value of the communication performance characteristic parameter may be a parameter value of the communication performance characteristic parameter within a predetermined period.

Here, the predetermined period may be a period associated with the prediction of the parameter value of the communication performance characteristic parameter. Here, the network may configure the predetermined period for the terminal in advance. The terminal may also determine the predetermined period according to a predetermined rule. For example, the predetermined period may be a period counted from a predicted time point.

In an embodiment, it is necessary to predict a parameter value of a communication performance characteristic parameter of a candidate cell 1 (for example, a probability of occurrence of ping-pong handover), and the network configures a terminal with a parameter value of a communication performance characteristic parameter within a period B that needs to be predicted, that is, the predetermined period is the period B, then the terminal predicts the parameter value of the communication performance characteristic parameter of the terminal in the candidate cell 1 within the period B. Here, the predetermined period may be indicated by a start moment and an end moment. For example, the predetermined period corresponds to a moment a to a moment b. The predetermined period may also be indicated by the start moment and a duration. For example, the start moment corresponding to the predetermined period is the moment a, and a corresponding duration is c.

In an embodiment, in response to a wireless communication quality of the cell being less than a quality threshold, the probability of cell handover failure and/or the probability of wireless communication interruption is greater than a probability threshold.

In an embodiment, in response to overlapping coverage of different cells, the probability of occurrence of ping-pong handover is greater than the probability threshold. Here, since a signal quality of multiple cells is relatively close, the terminal may trigger more frequent handovers, and the number of handovers increases, which easily causes the ping-pong handover. Here, the ping-pong handover may be an event that the terminal is handed over back to a source cell within the predefined time after being handed over from the source cell to the target cell, in which the number of times of occurrences of the event is more than one.

In an embodiment, the quality of the wireless communication may be at least one of a reference signal receiving power (RSRP), a reference signal receiving quality (RSRQ), and a signal to interference plus noise ratio (SINR). Here, a value of the quality of the wireless communication may be an average value and/or a peak value of the quality of the wireless communication.

In an embodiment, a value of the data transmission rate may be an average value and/or a peak value of the data transmission rate.

In an embodiment, a value of the data transmission delay may be an average value, a minimum value and/or a maximum value of the data transmission delay.

In an embodiment, a recommendation degree of a candidate cell may be predicted by one or more parameters included in the mobility and service characteristic parameter and the communication performance characteristic parameter. Here, a recommendation degree of a candidate cell may be predicted based on the parameters included in the mobility and service characteristic parameter and the communication performance characteristic parameter as well as a machine learning algorithm.

In an embodiment, a recommendation degree of a cell is determined according to a predicted value of multiple predicted parameters. In an embodiment, a recommendation degree of a cell is determined according to a weighted predicted value of multiple predicted parameters. For example, in case that a value of the quality of service (QoS) requirement parameter within the predetermined period is a, the probability of cell handover failure is b, the probability of occurrence of ping-pong handover is c, and weighting coefficients are x, y, and z, respectively, the recommendation degree of the cell may be a weighted predicted value N of a, b and c. Here, $N=ax+by+cz$. Here, the weighting coefficients for acquiring the weighted predicted value may be preset.

In an embodiment, the predicted value of the predicted parameter may be determined by using the machine learning algorithm based on a value of a historical predicted parameter of the target cell. It is determined whether to ignore the handover command of cell handover according to the predicted value of the predicted parameter. Here, the machine learning algorithm may be trained by using the value of the historical predicted parameter of the target cell within a historical period to obtain a trained machine learning algorithm model. The predicted value of the predicted parameter is generated by using the machine learning algorithm model.

In an embodiment, in response to the predicted value of the predicted parameter being greater than or equal to a reference threshold, it is determined to ignore the handover command of cell handover. For example, in response to the data transmission delay being greater than the delay threshold, it is determined to ignore the handover command of cell handover. In an embodiment, in response to the predicted value of the predicted parameter being less than the reference threshold, it is determined not to ignore the handover command of cell handover. For example, in response to a signal-to-noise ratio of a transmission channel being less than a signal-to-noise ratio threshold, it is determined not to ignore the handover command of cell handover. Here, not to ignore the handover command of cell handover may be executing the handover command. Here, the reference threshold may be a configuration received by the terminal from the base station, or may be preset and stored in the terminal.

In an embodiment, it is determined whether to ignore the handover command of cell handover according to the predicted value of the mobility and service characteristic parameter of the terminal after the terminal is handed over to the target cell which is determined by using the machine learning algorithm. In an embodiment, in response to determining that a predicted value of a probability of occurrence of a service with a traffic greater than the traffic threshold within the predetermined period indicated by the mobility and service characteristic parameter of the terminal after the terminal is handed over to the target cell which is determined by using the machine learning algorithm is greater than the probability threshold, it is determined to ignore the handover command of cell handover. In an embodiment, in response to determining that a predicted value of a probability of occurrence of a service with a delay less than the delay threshold within the predetermined period indicated by the mobility and service characteristic parameter of the terminal after the terminal is handed over to the target cell which is determined by using the machine learning algorithm is greater than the probability threshold, it is determined not to ignore the handover command of cell handover.

In an embodiment, it is determined whether to ignore the handover command of cell handover according to the predicted value of the communication performance characteristic parameter of the terminal after the terminal is handed over to the target cell which is determined by using the machine learning algorithm. In an embodiment, in response to determining that a predicted value of a probability of cell handover failure indicated by the communication performance characteristic parameter of the terminal after the terminal is handed over to the target cell which is determined by using the machine learning algorithm is greater than the probability threshold, it is determined to ignore the handover command of cell handover. In an embodiment, in response to determining that the predicted value of the data transmission rate indicated by the communication performance characteristic parameter of the terminal after the terminal is handed over to the target cell which is determined by using the machine learning algorithm is greater than the probability threshold, it is determined not to ignore the handover command of cell handover.

In an embodiment, it is determined whether to ignore the handover command of cell handover according to the predicted value of the mobility and service characteristic parameter of the terminal and the predicted value of the communication performance characteristic parameter of the terminal after the terminal is handed over to the target cell which is determined by using the machine learning algorithm. In an embodiment, in response to determining that a predicted value of a probability of occurrence of a service with a traffic greater than the traffic threshold within the predetermined period indicated by the mobility and service characteristic parameter of the terminal after the terminal is handed over to the target cell which is determined by using the machine learning algorithm is greater than the probability threshold, and a predicted value of a probability of cell handover failure indicated by the communication performance characteristic parameter of the terminal after the terminal is handed over to the target cell which is determined by using the machine learning algorithm is greater than the probability threshold, it is determined to ignore the handover command of cell handover. In an embodiment, in response to determining that a predicted value of a probability of occurrence of a service with a delay less than the delay threshold within the predetermined period indicated by the mobility and service characteristic parameter of the terminal after the terminal is handed over to the target cell which is determined by using the machine learning algorithm is greater than the probability threshold, and the predicted value of the data transmission rate indicated by the communication performance characteristic parameter of the terminal after the terminal is handed over to the target cell which is determined by using the machine learning algorithm is greater than the probability threshold, it is determined not to ignore the handover command of cell handover.

In an embodiment, the determination message determining to ignore the handover command is sent to the base station, in response to determining to ignore the handover command.

In an embodiment, it is determined to ignore the handover command of cell handover, in response to the predicted value of the predicted parameter being greater than or equal to the reference threshold. For example, it is determined to ignore the handover command of cell handover, in response to the data transmission delay being greater than the delay threshold.

In an embodiment, in response to determining that a predicted value of a probability of occurrence of a service with a traffic greater than the traffic threshold within the predetermined period indicated by the mobility and service characteristic parameter of the terminal after the terminal is handed over to the target cell which is determined by using the machine learning algorithm is greater than the probability threshold, it is determined to ignore the handover command of cell handover.

In an embodiment, in response to determining that a predicted value of a probability of cell handover failure indicated by the communication performance characteristic parameter of the terminal after the terminal is handed over to the target cell which is determined by using the machine learning algorithm is greater than the probability threshold, it is determined to ignore the handover command of cell handover.

In an embodiment, an acknowledgement message indicating authorization may be sent to the terminal, in response to determining that the base station receives the determination message determining to ignore the handover command, so that the terminal may ignore the handover command after receiving the acknowledgement message. In another embodiment, an acknowledgement message indicating authorization may not be sent to the terminal, in response to determining that the base station receives the determination message determining to ignore the handover command, so that the terminal will not execute the handover command without receiving the acknowledgement message. In yet another embodiment, an acknowledgement message indicating non-authorization may be sent to the terminal, in response to determining that the base station receives the determination message determining to ignore the handover command, so that the terminal may ignore the handover command after receiving the acknowledgement message.

As shown in FIG. 14, a cell handover method is provided in an embodiment of the present disclosure. The method is performed by a base station and includes a step as follows.

In step 141, indication information is sent to the terminal, in which the indication information is configured to indicate whether the terminal is allowed to ignore the handover command.

In an embodiment, the base station sends the indication information to the terminal, in response to determining that a radio resource control (RRC) connection is established between the terminal and the base station.

In an embodiment, the base station sends the indication information to the terminal in one of the following ways: sending by the base station the indication information to the terminal through a system message; sending by the base station the indication information to the terminal through a random access message of a random access procedure of the terminal; or sending by the base station the indication information to the terminal through an RRC message.

In an embodiment, the terminal can ignore the handover command, in response to determining that the indication information is configured to indicate that the terminal is allowed to ignore the handover command. The terminal cannot ignore the handover command, in response to determining that the indication information is configured to indicate that the terminal is not allowed to ignore the handover command.

Here, the terminal ignoring the handover command may mean that the handover command is not executed after the handover command is received. The terminal not ignoring the handover command may mean that the handover command is executed after the handover command is received.

It is to be noted that those skilled in the art may understand that the methods provided in the embodiments of the present disclosure may be executed alone, or may be executed together with some methods in the embodiments of the present disclosure or some methods in related technologies.

Figure 15:
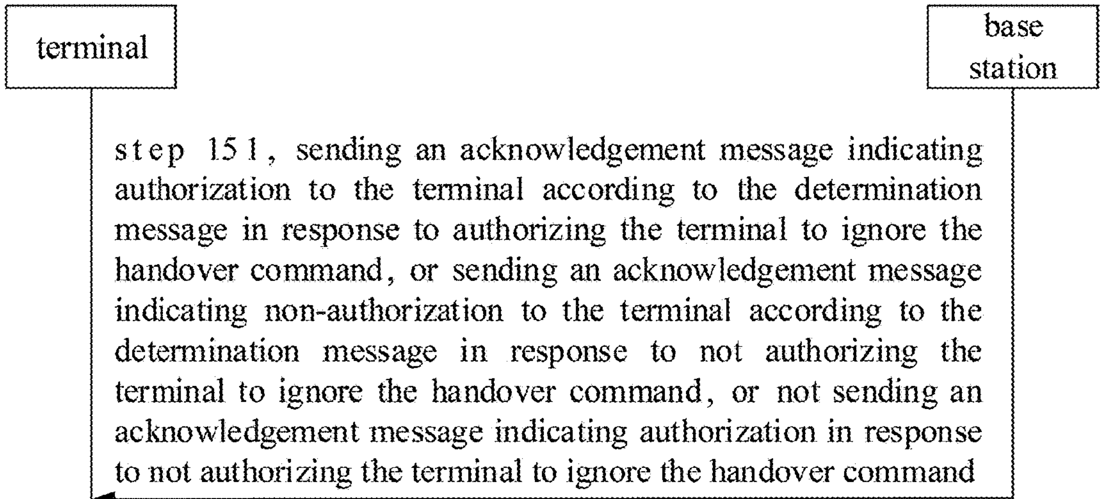
FIG. 15 is a flow chart showing a cell handover method according to an illustrative embodiment.

As shown in FIG. 15, a cell handover method is provided in an embodiment of the present disclosure. The method is performed by a base station and includes a step as follows.

In step 151, an acknowledgement message indicating authorization is sent to the terminal according to the determination message in response to authorizing the terminal to ignore the handover command, or an acknowledgement message indicating non-authorization is sent to the terminal according to the determination message in response to not authorizing the terminal to ignore the handover command, or an acknowledgement message indicating authorization is not sent in response to not authorizing the terminal to ignore the handover command.

In an embodiment, the terminal sends the determination message determining to ignore the handover command to the base station. In response to determining that the base station receives the determination message determining to ignore the handover command, the acknowledgement message indicating authorization may be sent to the terminal. In response to determining that the terminal receives the acknowledgement message indicating authorization sent by the base station according to the determination message, the terminal ignores the handover command.

In an embodiment, the terminal sends the determination message determining to ignore the handover command to the base station. In response to determining that the base station receives the determination message determining to ignore the handover command, the acknowledgement message indicating non-authorization may be sent to the terminal. In response to determining that the terminal receives the acknowledgement message indicating non-authorization sent by the base station according to the determination message, the terminal executes the handover command.

In an embodiment, the terminal sends the determination message determining to ignore the handover command to the base station. In response to determining that the base station receives the determination message determining to ignore the handover command, the acknowledgement message indicating authorization may not be sent to the terminal. In response to determining that the terminal does not receive the acknowledgement message indicating authorization sent by the base station according to the determination message, the terminal executes the handover command.

It is to be noted that those skilled in the art may understand that the methods provided in the embodiments of the present disclosure may be executed alone, or may be executed together with some methods in the embodiments of the present disclosure or some methods in related technologies.

Figure 16:
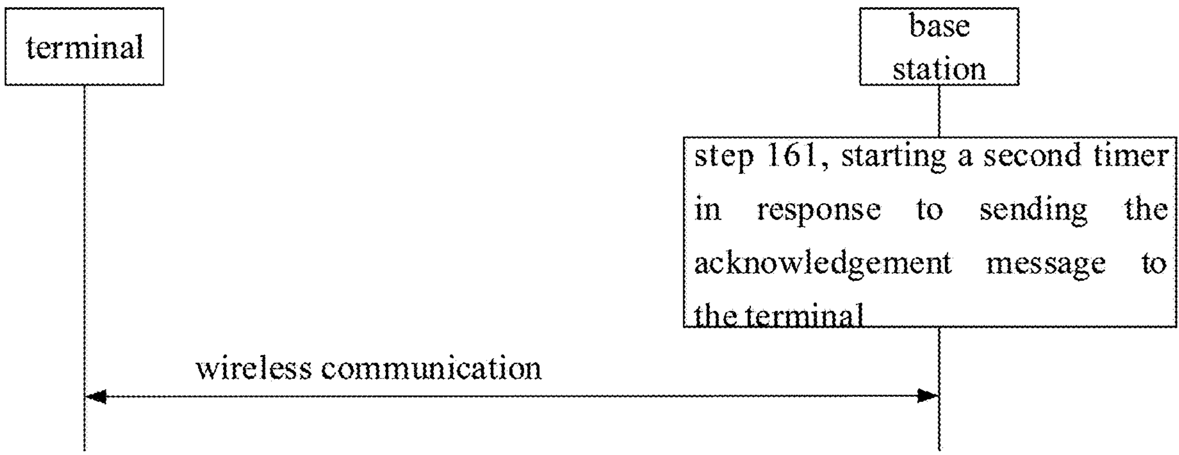
FIG. 16 is a flow chart showing a cell handover method according to an illustrative embodiment.

As shown in FIG. 16, a cell handover method is provided in an embodiment of the present disclosure. The method is performed by a base station and includes a step as follows.

In step 161, a second timer is started in response to sending the acknowledgement message to the terminal.

In an embodiment, a timing duration of the second timer may be determined according to a required delay.

In an embodiment, it is determined that the timing duration of the second timer is less than a duration threshold, in response to the required delay being less than a delay threshold. It is determined that the timing duration of the second timer is greater than the duration threshold, in response to the required delay being greater than the delay threshold.

It is to be noted that those skilled in the art may understand that the methods provided in the embodiments of the present disclosure may be executed alone, or may be executed together with some methods in the embodiments of the present disclosure or some methods in related technologies.

As shown in FIG. 17, a cell handover method is provided in an embodiment of the present disclosure. The method is performed by a base station and includes a step as follows.

In step 171, it is determined to stop the cell handover corresponding to the handover command in response to not receiving a message sent by a target base station before a timing of the second timer expires, the message indicating that the cell handover is successful.

In an embodiment, the second timer is started in response to sending an acknowledgement message to the terminal. It is determined to stop the cell handover corresponding to the handover command in response to not receiving a message sent by a target base station before a timing of the second timer expires, the message indicating that the cell handover is successful.

In an embodiment, the timing duration of the second timer may be determined according to the required delay.

In an embodiment, it is determined that the timing duration of the second timer is less than the duration threshold, in response to the required delay being less than the delay threshold. It is determined that the timing duration of the second timer is greater than the duration threshold, in response to the required delay being greater than the delay threshold.

It is to be noted that those skilled in the art may understand that the methods provided in the embodiments of the present disclosure may be executed alone, or may be executed together with some methods in the embodiments of the present disclosure or some methods in related technologies.

As shown in FIG. 18, a cell handover method is provided in an embodiment of the present disclosure. The method is performed by a base station and includes a step as follows.

In step 181, configuration information is sent to the terminal, in which the configuration information includes at least one of indication information indicating whether the terminal is allowed to ignore the handover command, threshold range information indicating a threshold range of the predicted value, and the predicted parameter.

In an embodiment, the configuration information sent by the base station is received, in response to determining that a radio resource control (RRC) connection is established between the terminal and the base station.

In an embodiment, the terminal receives the configuration information sent by the base station in one of the following ways: receiving the configuration information sent by the base station through a system message, receiving the configuration information sent by the base station through a random access message of a random access procedure of the terminal, and receiving the configuration information sent by the base station through an RRC message.

In an embodiment, the terminal can ignore the handover command, in response to determining that the indication information is configured to indicate that the terminal is allowed to ignore the handover command. The terminal cannot ignore the handover command, in response to determining that the indication information is configured to indicate that the terminal is not allowed to ignore the handover command.

Here, the terminal ignoring the handover command may mean that the handover command is not executed after the handover command is received. The terminal not ignoring the handover command may mean that the handover command is executed after the handover command is received.

In an embodiment, it is determined that the predicted value is within the threshold range, in response to the predicted value being less than a reference value indicated by the information within the threshold range. It is determined that the predicted value is not within the threshold range, in response to the predicted value being greater than a reference value indicated by the information within the threshold range. In another embodiment, it is determined that the predicted value is within the threshold range, in response to the predicted value being greater than a reference value indicated by the information within the threshold range. It is determined that the predicted value is not within the threshold range, in response to the predicted value being less than a reference value indicated by the information within the threshold range.

In an embodiment, it is determined to ignore the handover command, in response to determining that the handover command is received and the predicted value is within the threshold range. Alternatively, it is determined to execute the handover command, in response to determining that the handover command is received and the predicted value is not within the threshold range.

In an embodiment, the predicted parameter includes one or more of the following mobility and service characteristic parameters: a probability of occurrence of a service with a traffic greater than a traffic threshold, a probability of occurrence of a service with a delay less than a delay threshold, a motion trajectory parameter and/or a motion direction parameter of the terminal, a quality of service (QoS) requirement parameter, and a quality of experience (QoE) requirement parameter.

In an embodiment, the predicted parameter includes one or more of the following communication performance characteristic parameters: a probability of cell handover failure, a probability of wireless communication interruption, a probability of occurrence of ping-pong handover, a probability of occurrence of a QoS and/or a QoE not meeting a predetermined requirement, a resident time in the target cell, a quality of a wireless communication, a data transmission rate, a data transmission delay, and a recommendation degree of the target cell.

It is to be noted that those skilled in the art may understand that the methods provided in the embodiments of the present disclosure may be executed alone, or may be executed together with some methods in the embodiments of the present disclosure or some methods in related technologies.

As shown in FIG. 19, a cell handover apparatus is provided in an embodiment of the present disclosure. The apparatus is applied to a terminal and includes a determining module 191.

The determining module 191 is configured to determine whether to ignore a handover command of cell handover according to a predicted value of a predicted parameter, in which the predicted parameter includes a mobility and service characteristic parameter and/or a communication performance characteristic parameter of the terminal after the terminal is handed over to a target cell.

It is to be noted that those skilled in the art may understand that the methods provided in the embodiments of the present disclosure may be executed alone, or may be executed together with some methods in the embodiments of the present disclosure or some methods in related technologies.

Figure 20:
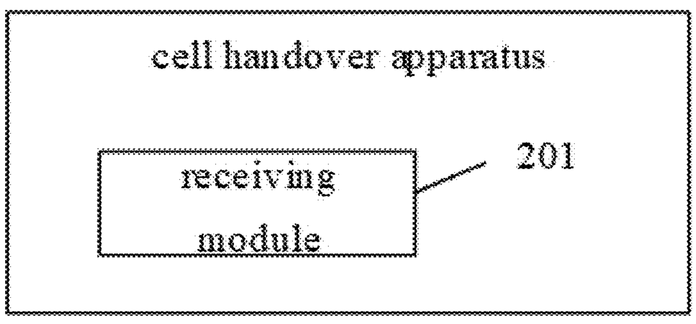
FIG. 20 is a schematic diagram illustrating a cell handover apparatus according to an illustrative embodiment.

As shown in FIG. 20, a cell handover apparatus is provided in an embodiment of the present disclosure. The apparatus is applied to a base station and includes a receiving module 201.

The receiving module 201 is configured to receive a determination message sent by a terminal to determine to ignore a handover command, in which the determination message is a message sent in response to the terminal determining to ignore the handover command of cell handover according to a predicted value of a predicted parameter, and the predicted parameter includes a mobility and service characteristic parameter and/or a communication performance characteristic parameter of the terminal after the terminal is handed over to a target cell.

It is to be noted that those skilled in the art may understand that the methods provided in the embodiments of the present disclosure may be executed alone, or may be executed together with some methods in the embodiments of the present disclosure or some methods in related technologies.

For the apparatus in the above-mentioned embodiments, the specific way in which each module performs operations has been described in detail in the embodiments of the method, which will not be elaborated herein.

In the embodiment of the present disclosure, whether to ignore the handover command of cell handover is determined according to the predicted value of the predicted parameter, in which the predicted parameter includes the mobility and service characteristic parameter and/or the communication performance characteristic parameter of the terminal after the terminal is handed over to the target cell. Here, since the terminal may determine whether to ignore the handover command of cell handover according to the predicted value, and the predicted value may be adapted to the mobility and service characteristic and/or the communication performance characteristic of the terminal after the terminal is handed over to the target cell, compared with a manner in which cell handover must be performed after receiving a handover command, it may be adapted to the mobility and service characteristic and/or the communication performance characteristic of the terminal after the terminal is handed over to the target cell, making a wireless communication more reliable.

An embodiment of the present disclosure provides a communication device. The communication device includes a processor, a memory for storing instructions executable by the processor, in which the processor is configured to implement the method applied to any embodiment of the present disclosure when executing the executable instructions.

The processor may include various types of storage medium, which are non-transitory computer storage medium that may continue to memorize information stored thereon after the communication device is powered down. The processor may be connected to the memory through a bus or the like, for reading the executable program stored on the memory.

The present disclosure also provides a non-transitory computer storage medium. The computer storage medium having stored therein computer executable programs that, when executed by a processor, cause the method of any embodiment of the present disclosure to be implemented.

For the apparatus in the above-mentioned embodiments, the specific way in which each module performs operations has been described in detail in the embodiments of the method, which will not be elaborated herein.

Figure 21:
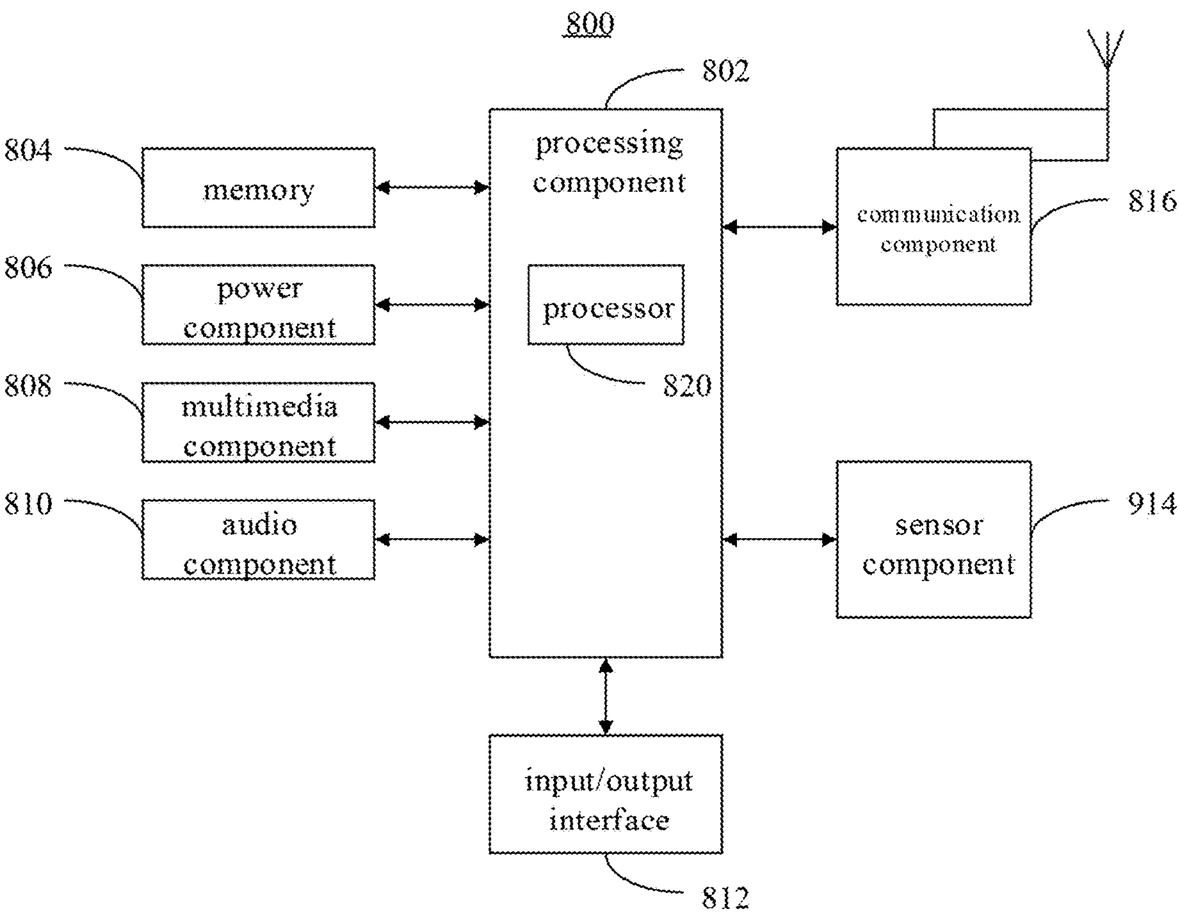
FIG. 21 is a schematic diagram illustrating a terminal according to an illustrative embodiment.

As shown in FIG. 21, an embodiment of the present disclosure provides a structure of a terminal.

Referring to a terminal 800 shown in FIG. 21, an embodiment of the present disclosure provides the terminal 800. The terminal 800 may specifically be a mobile phone, a computer, a digital broadcast terminal, a messaging device, a game console, a tablet device, a medical device, a fitness device, a personal digital assistant, or the like.

Referring to FIG. 21, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, phone calls, data communications, camera operations, and recording operations. The processing component 802 may include one or more processors 820 to execute instructions to perform all or some of the steps in the above-described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as keyboards, click wheels, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may further include a light sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 is configured to facilitate communication, wired or wireless, between the terminal 800 and other devices. The terminal 800 may access a wireless network based on any communication standard, such as Wi-Fi, 2G, or 3G, or a combination thereof. In an illustrative embodiment, the communication component 816 receives a broadcast signal or broadcast associated information from an external broadcast management system via a broadcast channel. In an illustrative embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 804, executable by the processor 820 in the terminal 800, for completing the above-mentioned method. For example, the non-transitory computer-readable storage medium may be a ROM, a random access memory (RAM), a CD-ROM, a magnetic tape, a floppy disc, an optical data storage device, and the like.

Figure 22:
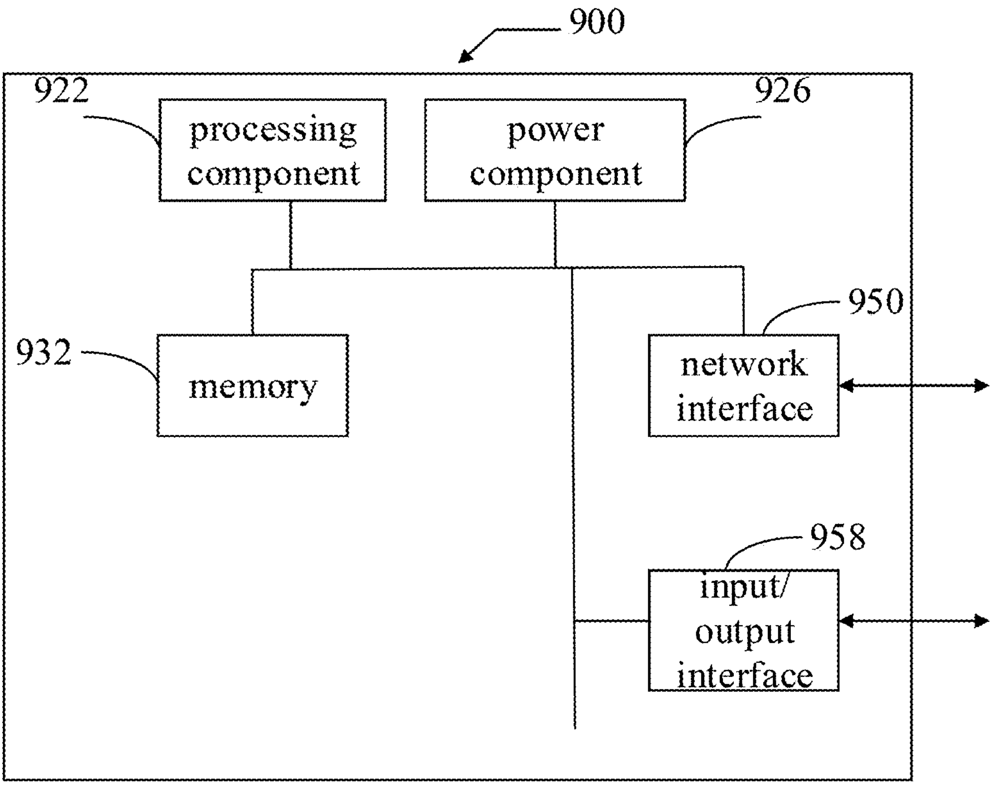
FIG. 22 is a block diagram of a base station according to an illustrative embodiment.

As shown in FIG. 22, an embodiment of the present disclosure shows a structure of a base station. For example, the base station 900 may be provided as a network side device. Referring to FIG. 22, the base station 900 includes a processing component 922, which further includes one or more processors, and memory resources represented by a memory 932 for storing instructions executable by the processing component 922, such as application programs. The application programs stored in the memory 932 may include one or more modules, each corresponding to a set of instructions. In addition, the processing component 922 is configured to execute instructions to perform any of the methods described above applied to the base station.

The base station 900 may further include a power component 926 configured to perform power management of the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A cell handover method, performed by a terminal, comprising:

determining whether to ignore a handover command of cell handover according to a predicted value of a predicted parameter, wherein the predicted parameter comprises a mobility and service characteristic parameter and/or a communication performance characteristic parameter of the terminal after the terminal is handed over to a target cell, and a recommendation degree of a cell for cell handover is determined according to a weighted predicted value of multiple predicted parameters.

2. The method of claim 1, wherein the method further comprises:

determining to ignore the handover command in response to the predicted value being within a threshold range; or determining to execute the handover command in response to the predicted value being not within a threshold range.

3. The method of claim 1, wherein the method further comprises:

determining the predicted value according to type information of the terminal, historical mobility and service characteristic information of the terminal and/or historical communication performance characteristic information of the terminal.

4. The method of claim 1, wherein the method comprises:

receiving indication information sent by a base station;

wherein the indication information is configured to indicate whether the terminal is allowed to ignore the handover command.

5. The method of claim 4, wherein determining whether to ignore the handover command of cell handover according to the predicted value of the predicted parameter comprises:

determining whether to ignore the handover command of cell handover according to the predicted value of the predicted parameter in response to configuration information configured to indicate that the terminal is allowed to ignore the handover command.

6. The method of claim 1, wherein the method further comprises:

sending a determination message determining to ignore the handover command to a base station in response to determining to ignore the handover command;

wherein the method further comprises one of:

ignoring the handover command in response to receiving an acknowledgement message indicating authorization sent by the base station according to the determination message;

executing the handover command in response to receiving an acknowledgement message indicating non-authorization sent by the base station according to the determination message; or executing the handover command in response to not receiving an acknowledgement message indicating authorization sent by the base station according to the determination message.

7. The method of claim 6, wherein the method further comprises:

determining the acknowledgement message being not received in response to not receiving the acknowledgement message within a predetermined duration.

8. The method of claim 7, wherein determining the acknowledgement message being not received in response to not receiving the acknowledgement message within the predetermined duration comprises:

starting a first timer in response to sending the determination message determining to ignore the handover command to the base station;

wherein a timing duration of the first timer is the predetermined duration; and determining the acknowledgement message being not received in response to not receiving the acknowledgement message before a timing of the first timer expires.

9. The method of claim 1, wherein the method further comprises:

receiving configuration information sent by a base station;

wherein the configuration information comprises at least one of:

indication information indicating whether the terminal is allowed to ignore the handover command;

threshold range information indicating a threshold range of the predicted value; and the predicted parameter.

10. The method of claim 1, wherein the mobility and service characteristic parameter comprises one or more of:

a probability of occurrence of a service with a traffic greater than a traffic threshold;

a probability of occurrence of a service with a delay less than a delay threshold;

a motion trajectory parameter and/or a motion direction parameter of the terminal;

a quality of service (QoS) requirement parameter; and a quality of experience (QoE) requirement parameter.

11. The method of claim 1, wherein the communication performance characteristic parameter comprises one or more of:

a probability of cell handover failure;

a probability of wireless communication interruption;

a probability of occurrence of ping-pong handover;

a probability of occurrence of a QoS and/or a QoE not meeting a predetermined requirement;

a resident time in the target cell;

a quality of a wireless communication;

a data transmission rate;

a data transmission delay; and a recommendation degree of the target cell.

12. A cell handover method, performed by a base station, comprising:

receiving a determination message sent by a terminal to determine to ignore a handover command;

wherein the determination message is a message sent in response to the terminal determining to ignore the handover command of cell handover according to a predicted value of a predicted parameter; and the predicted parameter comprises a mobility and service characteristic parameter and/or a communication performance characteristic parameter of the terminal after the terminal is handed over to a target cell, and a recommendation degree of a cell for cell handover is determined according to a weighted predicted value of multiple predicted parameters.

13. The method of claim 12, wherein the method further comprises:

sending indication information to the terminal;

wherein the indication information is configured to indicate whether the terminal is allowed to ignore the handover command.

14. The method of claim 12, wherein the method further comprises:

sending an acknowledgement message indicating authorization to the terminal according to the determination message in response to authorizing the terminal to ignore the handover command; or sending an acknowledgement message indicating non-authorization to the terminal according to the determination message in response to not authorizing the terminal to ignore the handover command; or not sending an acknowledgement message indicating authorization in response to not authorizing the terminal to ignore the handover command.

15. The method of claim 14, wherein the method further comprises:

starting a second timer in response to sending the acknowledgement message to the terminal; and determining to stop the cell handover corresponding to the handover command in response to not receiving a message sent by a target base station before a timing of the second timer expires, the message indicating that the cell handover is successful.

16. The method of claim 12, wherein the method further comprises:

sending configuration information to the terminal;

wherein the configuration information comprises at least one of:

indication information indicating whether the terminal is allowed to ignore the handover command;

threshold range information indicating a threshold range of the predicted value; and the predicted parameter.

17. The method of claim 12, wherein the mobility and service characteristic parameter comprises one or more of:

a probability of occurrence of a service with a traffic greater than a traffic threshold;

a probability of occurrence of a service with a delay less than a delay threshold;

a motion trajectory parameter and/or a motion direction parameter of the terminal;

a quality of service (QoS) requirement parameter; and a quality of experience (QoE) requirement parameter.

18. The method of claim 12, wherein the communication performance characteristic parameter comprises one or more of:

a probability of cell handover failure;

a probability of wireless communication interruption;

a probability of occurrence of ping-pong handover;

a probability of occurrence of a QoS and/or a QoE not meeting a predetermined requirement;

a resident time in the target cell;

a quality of a wireless communication;

a data transmission rate;

a data transmission delay; and a recommendation degree of the target cell.

19. A communication device, comprising:

an antenna;

a memory;

a processor connected to the antenna and the memory, respectively, and configured to control transmission and reception of the antenna by executing computer-executable instructions stored in the memory, and being capable of implementing the method provided in claim 12.

20. A communication device, comprising:

an antenna;

a memory;

a processor connected to the antenna and the memory, respectively, and configured to control transmission and reception of the antenna by executing computer-executable instructions stored in the memory, and being capable of determining whether to ignore a handover command of cell handover according to a predicted value of a predicted parameter, wherein the predicted parameter comprises a mobility and service characteristic parameter and/or a communication performance characteristic parameter of the terminal after the terminal is handed over to a target cell, and a recommendation degree of a cell for cell handover is determined according to a weighted predicted value of multiple predicted parameters.

* * * * *